United States Patent
Lin

(10) Patent No.: US 10,845,910 B1
(45) Date of Patent: Nov. 24, 2020

(54) DISPLAY PANEL AND DISPLAY DEVICE

(71) Applicant: Xiamen Tianma Micro-Electronics Co., Ltd, Xiamen (CN)

(72) Inventor: Fuyin Lin, Xiamen (CN)

(73) Assignee: Xiamen Tianma Micro-Electronics Co., Ltd, Xiamen (CN)

( * ) Notice: Subject to any disclaimer, the term of this patent is extended or adjusted under 35 U.S.C. 154(b) by 0 days.

(21) Appl. No.: 16/600,353

(22) Filed: Oct. 11, 2019

(30) Foreign Application Priority Data

Jun. 27, 2019 (CN) .......................... 2019 1 0565961

(51) Int. Cl.
*G06F 3/044* (2006.01)
*G06F 3/041* (2006.01)
*G06K 9/00* (2006.01)

(52) U.S. Cl.
CPC .......... *G06F 3/0412* (2013.01); *G06F 3/0446* (2019.05); *G06K 9/0002* (2013.01); *G06K 9/0004* (2013.01)

(58) Field of Classification Search
None
See application file for complete search history.

(56) References Cited

U.S. PATENT DOCUMENTS

2018/0196931 A1*  7/2018  Cho .................. G06F 3/0416
2019/0102006 A1*  4/2019  Suzuki ............... G06K 9/0002

FOREIGN PATENT DOCUMENTS

CN          108257979 A      7/2018
CN          108762546 A     11/2018

* cited by examiner

*Primary Examiner* — Carl Adams
(74) *Attorney, Agent, or Firm* — Christensen O'Connor Johnson Kindness PLLC

(57) ABSTRACT

Provided is a display panel, including: in the display area, fingerprint recognition electrode block groups arranged in $M_1$ rows and $N_1$ columns, each of which includes fingerprint recognition electrode blocks arranged in $m_1$ rows and $n_1$ columns, where $M_1$, $N_1$, $m_1$ and $n_1$ are natural numbers; and at least one fingerprint recognition signal line group, each of which includes fingerprint recognition signal lines; and in the non-display area, at least one transistor group, each of which includes switch transistors; and control signal lines. A fingerprint recognition electrode block in an $x_1^{th}$ row and $y_1^{th}$ column of a fingerprint recognition electrode block group in an $X_1^{th}$ row and $Y_1^{th}$ column is electrically connected to a fingerprint recognition electrode block in an $x_2^{th}$ row and $y_2^{th}$ column of a fingerprint recognition electrode block group in an $X_2^{th}$ row and $Y_2^{th}$ column via one of the fingerprint recognition signal lines.

17 Claims, 14 Drawing Sheets

DISPLAY PANEL AND DISPLAY DEVICE

CROSS-REFERENCE TO RELATED APPLICATIONS

The present disclosure claims priority to Chinese Patent Application No. 201910565961.X, filed on Jun. 27, 2019, the content of which is incorporated herein by reference in its entirety.

TECHNICAL FIELD

The present disclosure relates to the technical field of display technologies, and in particular, to a display panel and a display device.

BACKGROUND

Fingerprints are inherent to everyone. With development of technologies, a variety of display devices having fingerprint recognition functions have appeared, such as cellphones, tablet computers and smart wearable devices. To operate a display device having a fingerprint recognition function, a user only needs to touch the display device with a finger to perform an authority verification, which simplifies the authority verification process. In addition, with an increase of fingerprint recognition application scenarios, demands for full-screen fingerprint recognition and fingerprint recognition accuracy have gradually increased. However, in the related art, the full-screen fingerprint recognition is limited by the number of terminals of a fingerprint recognition chip.

SUMMARY

In order to solve the above technical problems, the present disclosure provides a display panel and a display device.

In an aspect, an embodiment of the present disclosure provides a display panel. The display panel includes: in the display area, fingerprint recognition electrode block groups arranged in $M_1$ rows and $N_1$ columns, each of the fingerprint recognition electrode block groups including fingerprint recognition electrode blocks arranged in $m_1$ rows and $n_1$ columns, where $M_1$, $N_1$, $m_1$ and $n_1$ are natural numbers; and at least one fingerprint recognition signal line group, each of the at least one fingerprint recognition signal line group including fingerprint recognition signal lines; and in the non-display area, at least one transistor group, each of the at least one transistor group including switch transistors; and control signal lines. A fingerprint recognition electrode block in an $x_1^{th}$ row and $y_1^{th}$ column of a fingerprint recognition electrode block group in an $X_1^{th}$ row and $Y_1^{th}$ column is electrically connected to a fingerprint recognition electrode block in an $x_2^{th}$ row and $y_2^{th}$ column of a fingerprint recognition electrode block group in an $X_2^{th}$ row and $Y_2^{th}$ column via one of the fingerprint recognition signal lines, where $X_1$, $Y_1$, $x_1$, $y_1$, $X_2$, $Y_2$, $x_2$ and $y_2$ are natural numbers, $X_1 \leq M_1$ and $X_2 \leq M_1$, $Y_1 \leq N_1$ and $Y_2 \leq N_1$, $X_1 \neq X_2$, $Y_1 \neq Y_2$, $x_1 \leq m_1$ and $x_2 \leq m_1$, $y_1 \leq n_1$ and $y_2 \leq n_1$. The one of the fingerprint recognition signal lines is electrically connected to a first electrode of one switch transistor of one of the at least one transistor group; and a control electrode of the switch transistor is electrically connected to one of the control signal lines.

In another aspect, an embodiment of the present disclosure provides a display device including the display panel described above.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, other drawings can also be acquired by those skilled in the art.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that although the device may be described using the terms of "first", "second", etc., in the embodiments of the present disclosure, the device will not be limited to these terms. These terms are merely used to distinguish devices from one another. For example, without departing from the scope of the embodiments of the present disclosure, a first device may also be referred to as a second device, and similarly, a second device may also be referred to as a first device.

Figure 1:
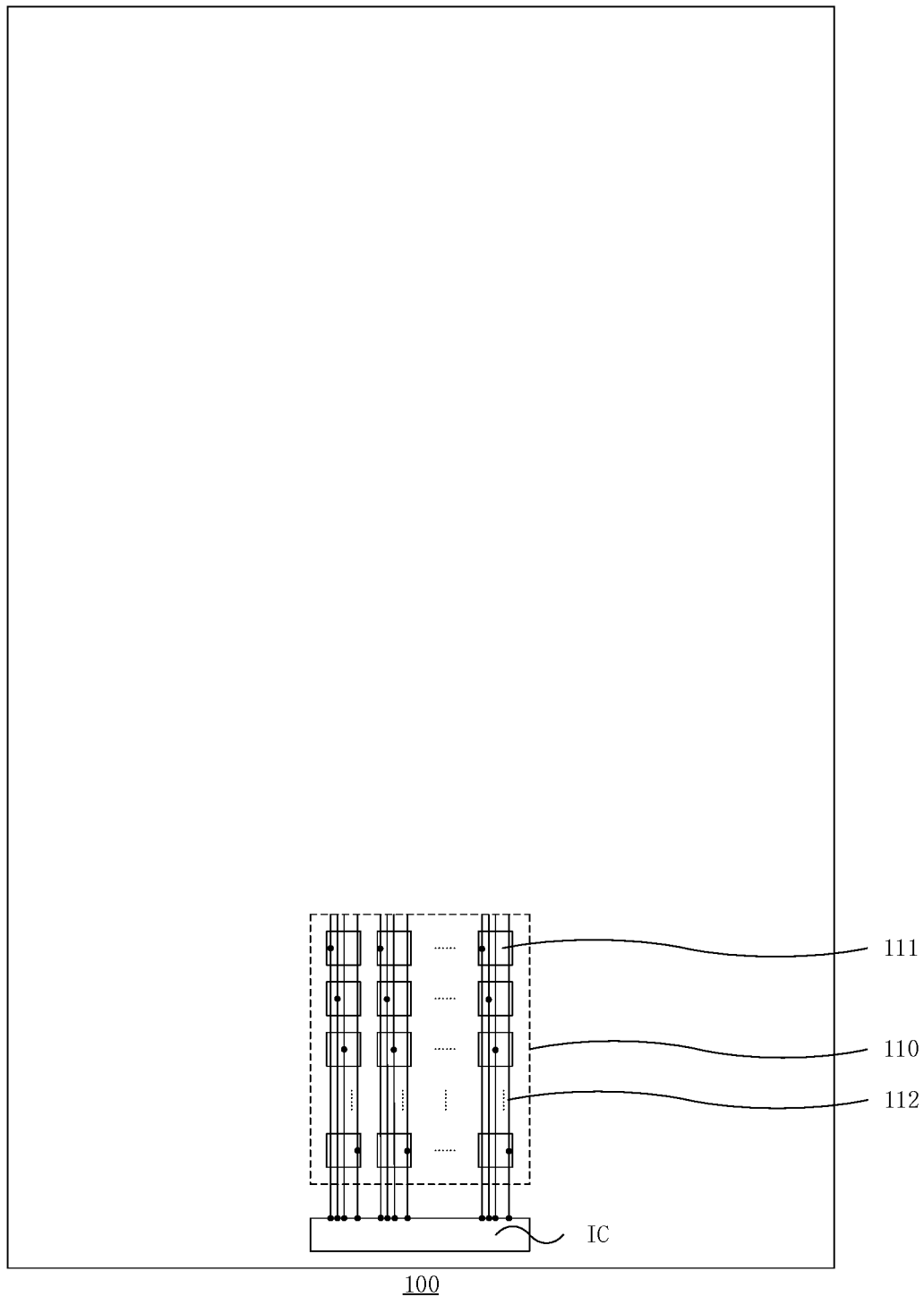
FIG. 1 is a structural schematic diagram of a display panel in the related art.

FIG. 1 is a structural schematic diagram of a display panel in the related art;

As shown in FIG. 1, in the related art, the display panel 100 includes a fingerprint recognition area 110 and a fingerprint recognition chip IC. Fingerprint recognition electrode blocks 111 and fingerprint recognition signal lines 112 are provided in the fingerprint recognition area 110. One fingerprint recognition electrode block 111 is electrically connected to one terminal of the fingerprint recognition chip IC via one fingerprint recognition signal line 112. The fingerprint recognition area 110 is a relatively small area, on which a small number of fingerprint recognition electrode blocks 111 and a small number of fingerprint recognition signal lines 112 are provided, and thus the fingerprint recognition chip IC includes a sufficient number of terminals. When the fingerprint recognition area 110 is enlarged, more fingerprint recognition electrode blocks 111 and more fingerprint recognition signal lines 112 are provided. However, a limited number of terminals of the fingerprint recognition chip IC may not be sufficient for achieving full-screen fingerprint recognition.

In order to solve the above technical problems, the present disclosure provides a display panel and a display device.

Figure 2:
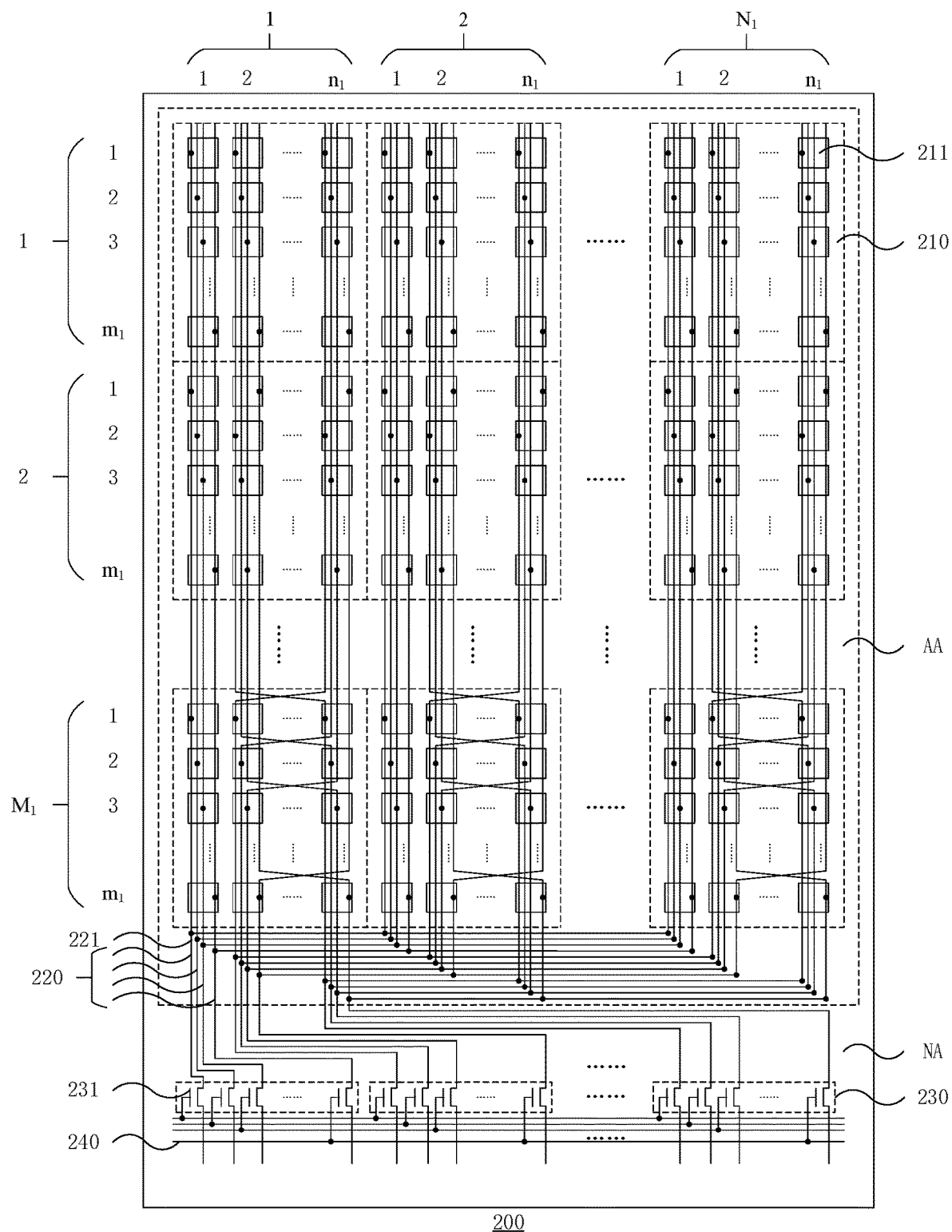
FIG. 2 is a structural schematic diagram of a display panel according to an embodiment of the present disclosure.

FIG. 2 is a structural schematic diagram of a display panel according to an embodiment of the present disclosure.

As shown in FIG. 2, the display panel 200 has a display area AA and a non-display area NA surrounding the display area AA. The display area AA is provided with fingerprint recognition electrode block groups 210 arranged in $M_1$ rows and $N_1$ columns, and each fingerprint recognition electrode block group 210 includes fingerprint recognition electrode blocks 211 arranged in $m_1$ rows and $n_1$ columns. Here, $M_1$, $N_1$, $m_1$, and $n_1$ are all natural numbers. The display area AA is further provided with fingerprint recognition signal line groups 220, and each fingerprint recognition signal line group 220 includes fingerprint recognition signal lines 221. The non-display area NA is provided with transistor groups 230, and each transistor group 230 includes a switch transistor 231. The non-display area NA is further provided with control signal lines 240. Here, the fingerprint recognition electrode block 211 in an $x_1^{th}$ row and $y_1^{th}$ column of the fingerprint recognition electrode block group 210 in an $X_1^{th}$ row and $Y_1^{th}$ column is electrically connected to the fingerprint recognition electrode block 211 in an $x_2^{th}$ row and $y_2^{th}$ column of the fingerprint recognition electrode block group 210 in an $X_2^{th}$ row and $Y_2^{th}$ column via one fingerprint recognition signal line 221. Here, $X_1$, $Y_1$, $x_1$, $y_1$, $X_2$, $Y_2$, $x_2$ and $y_2$ are all natural numbers, $X_1 \leq M_1$ and $X_2 \leq M_1$, $Y_1 \leq N_1$ and $Y_2 \leq N_1$, $X_1 \neq X_2$, $Y_1 \neq Y_2$, $x_1 \leq m_1$ and $x_2 \leq m_1$, $y_1 \leq n_1$ and $y_2 \leq n_1$. The one fingerprint recognition signal line 221 is electrically connected to a first electrode of the switch transistor 231 of one transistor group 230, and the switch transistor 231 includes a control electrode electrically connected to one control signal line 240.

In this embodiment of the present disclosure, the fingerprint recognition electrode block 211 in the $x_1^{th}$ row and $y_1^{th}$ column of the fingerprint recognition electrode block group 210 in the $X_1^{th}$ row and $Y_1^{th}$ column is electrically connected to the fingerprint recognition electrode block 211 in the $X_2^{th}$ row and $y_2^{th}$ column of the fingerprint recognition electrode block group 210 in the $X_2^{th}$ row and $Y_2^{th}$ column via one fingerprint recognition signal line 221. For example, the fingerprint recognition electrode block 211 in a $1^{st}$ row and $1^{st}$ column of the fingerprint recognition electrode block group 210 in a $1^{st}$ row and $1^{st}$ column is electrically connected to the fingerprint recognition electrode block 211 in a $1^{st}$ row and $1^{st}$ column of the fingerprint recognition electrode block group 210 in a $2^{nd}$ row and $1^{st}$ column via one fingerprint recognition signal line 221; and the fingerprint recognition electrode block 211 in a $1^{st}$ row and $2^{nd}$ column of the fingerprint recognition electrode block group 210 in the $1^{st}$ row and $1^{st}$ column is electrically connected to the fingerprint recognition electrode block 211 in a $2^{nd}$ row and $2^{nd}$ column of the fingerprint recognition electrode block group 210 in the $2^{nd}$ row and $1^{st}$ column via one fingerprint recognition signal line 221. The one fingerprint recognition signal line 221 is electrically connected to the first electrode of the switch transistor 231 of one transistor group 230, and the switch transistor 231 includes a control electrode electrically connected to one control signal line 240. In addition, the display panel 200 further includes a fingerprint recognition chip, and the fingerprint recognition chip includes terminals electrically connected to a second electrode of the above mentioned switch transistor 231. The fingerprint recognition electrode block 211 in the $x_1^{th}$ row and $y_1^{th}$ column of the fingerprint recognition electrode block group 210 in the $X_1^{th}$ row and $Y_1^{th}$ column and the fingerprint recognition electrode block 211 in the $X_2^{th}$ row and $y_2^{th}$ column of the fingerprint recognition electrode block group 210 in the $X_2^{th}$ row and $Y_2^{th}$ column receive a drive signal or send a detection signal via the one fingerprint recognition signal line 221. The above-mentioned one control signal line 240 transmits a turned-on signal, and the above-mentioned switch transistor 231 of the one transistor group 230 is turned on. The above-mentioned one fingerprint recognition signal line 221 receives the drive signal from the fingerprint recognition chip via the switch transistor 231 or sends the detection signal to the fingerprint recognition chip. The fingerprint recognition electrode block 211 in the $x_1^{th}$ row and $y_1^{th}$ column of the fingerprint recognition electrode block group 210 in the $X_1^{th}$ row and $Y_1^{th}$ column and the fingerprint recognition electrode block 211 in the $x_2^{th}$ row and $y_2^{th}$ column of the fingerprint recognition electrode block group 210 in the $X_2^{th}$ row and $Y_2^{th}$ column receive the drive signal from the fingerprint recognition chip or send the detection signal to the fingerprint recognition chip via one fingerprint recognition signal line 221. Thus, compared to a case in which they are electrically connected to the fingerprint recognition chip via two fingerprint recognition signal lines 221 and transmit a drive signal or a detection signal via these two fingerprint recognition signal lines 221 using time division approach, this embodiment of the present disclosure can reduce the number of fingerprint recognition signal lines 221 and the number of terminals of the fingerprint recognition chip, thereby increasing a fingerprint recognition rate. When the fingerprint recognition electrode block groups 210 arranged in $M_1$ rows and $N_1$ columns are expanded to an entire display area AA, multiple fingerprint recognition electrode blocks 211 share one fingerprint recognition signal line 221, so that the number of terminals of the fingerprint recognition chip is sufficient for achieving full-screen fingerprint recognition.

Figure 3:
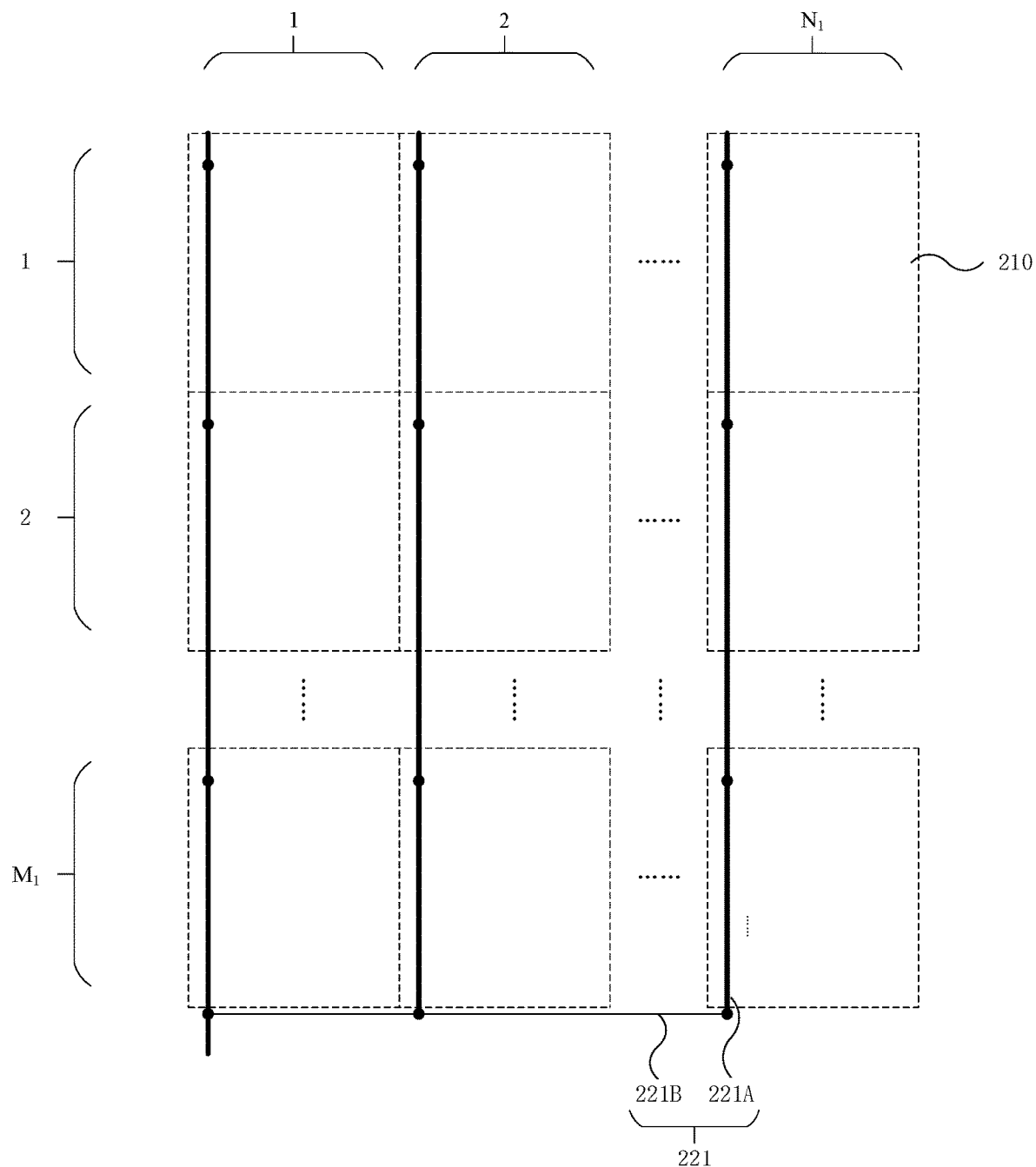
FIG. 3 is a structural schematic diagram of a fingerprint recognition signal line in a display panel according to an embodiment of the present disclosure.
Figure 4:
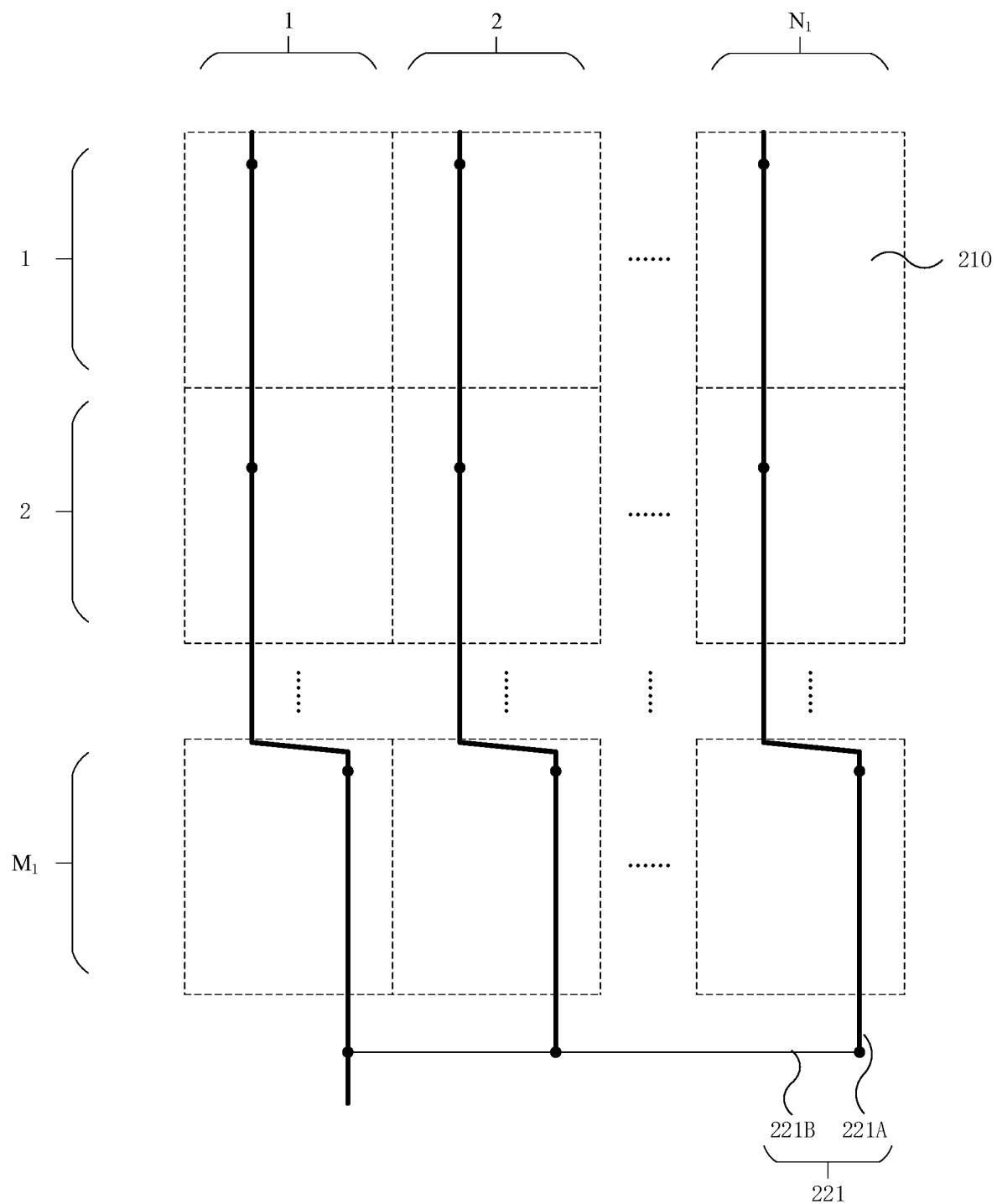
FIG. 4 is a structural schematic diagram of a fingerprint recognition signal line in another display panel according to an embodiment of the present disclosure.

FIG. 3 is a structural schematic diagram of a fingerprint recognition signal line in a display panel according to an embodiment of the present disclosure. FIG. 4 is a structural schematic diagram of a fingerprint recognition signal line in another display panel according to an embodiment of the present disclosure. As shown in FIG. 2 and FIG. 3, the display area AA is provided with fingerprint recognition electrode block groups 210 arranged in multiple rows and columns. One column of fingerprint recognition electrode block groups 210 extends in a first direction, and one row of fingerprint recognition signal line sections 221A extends in a second direction. Here, the first direction is perpendicular to the second direction. The fingerprint recognition signal line 221 includes a first fingerprint recognition signal line section 221A and a second fingerprint recognition signal line section 221B. One first fingerprint recognition signal line section 221A extends along one column of fingerprint recognition electrode block groups 210. One second fingerprint recognition signal line section 221B is electrically connected to multiple first fingerprint recognition signal line sections 221A. For example, a $1^{st}$ first fingerprint recognition signal line section 221A extends along a $1^{st}$ column of fingerprint recognition electrode block groups 210, a $2^{nd}$ first fingerprint recognition signal line section 221A extends along a $2^{nd}$ column of fingerprint recognition electrode block groups 210, and an $N_1^{th}$ first fingerprint recognition signal line section 221A extends along an $N_1^{th}$ column of fingerprint recognition electrode block groups 210. One second fingerprint recognition signal line section 221B is electrically connected to the $1^{st}$ first fingerprint recognition signal line section 221A, to the $2^{nd}$ first fingerprint recognition signal line section 221A, and to the $N_1^{th}$ fingerprint recognition signal line section 221A. For the fingerprint recognition signal line 221, each first fingerprint recognition signal line section 221A extends in the first direction, and the fingerprint recognition electrode blocks 211 that are electrically connected to the first fingerprint recognition signal line section 221A are arranged in one column of fingerprint recognition electrode blocks 211 in one column of fingerprint recognition electrode block groups 210. The second fingerprint recognition signal line section 221B extends in the second direction, and the second fingerprint recognition signal line section 221B is electrically connected to multiple first fingerprint recognition signal line sections 221A extending in the first direction. For example, one fingerprint recognition signal line 221 includes $N_1$ first fingerprint recognition signal line sections 221A and one second fingerprint recognition signal line section 221B. In this case, a $1^{st}$ first fingerprint recognition signal line section 221A is electrically connected to the fingerprint recognition electrode blocks 211 in the 1st row and $1^{st}$ column of the fingerprint recognition electrode block group 210 in the $1^{st}$ column, a $2^{nd}$ first fingerprint recognition signal line section 221A is electrically connected to the fingerprint recognition electrode blocks 211 in the $1^{st}$ row and $1^{st}$ column of the fingerprint recognition electrode block group 210 in the $2^{nd}$ column, and an $N_1^{th}$ first fingerprint recognition signal line section 221A is electrically connected to the fingerprint recognition electrode blocks 211 in the $1^{st}$ row and $1^{st}$ column of the fingerprint recognition electrode block group 210 in the $N_1^{th}$ column. Here, each of the above-mentioned $N_1$ first fingerprint recognition signal line sections 221A extend in the first direction. One second fingerprint recognition signal line section 221B is electrically connected to the above-mentioned $N_1$ first fingerprint recognition signal line sections 221A. This second fingerprint recognition signal line section 221B extends in the second direction.

As shown in FIG. 2 and FIG. 4, the display area is provided with fingerprint recognition electrode block groups 210 arranged in multiple rows and multiple columns. One column of fingerprint recognition electrode block groups 210 extends in a first direction, and one row of fingerprint recognition signal line sections 221A extends in a second direction. Here, the first direction is perpendicular to the second direction. The fingerprint recognition signal line 221 includes a first fingerprint recognition signal line section 221A and a second fingerprint recognition signal line section 221B. One first fingerprint recognition signal line section 221A extends along one column of fingerprint recognition electrode block groups 210. One second fingerprint recognition signal line section 221B is electrically connected to multiple fingerprint recognition signal line sections 221A. For example, a $1^{st}$ first fingerprint recognition signal line section 221A extends along a $1^{st}$ column of fingerprint recognition electrode block groups 210, a $2^{nd}$ first fingerprint recognition signal line section 221A extends along a $2^{nd}$ column of fingerprint recognition electrode block groups 210, and an $N_1^{th}$ first fingerprint recognition signal line section 221A extends along an $N_1^{th}$ column of fingerprint recognition electrode block groups 210; one second fingerprint recognition signal line section 221B is electrically connected to the $1^{st}$ first fingerprint recognition signal line section 221A, to the $2^{nd}$ first fingerprint recognition signal line section 221A, and to the Nit' fingerprint recognition signal line section 221A. For the fingerprint recognition signal line 221, one first fingerprint recognition signal line section 221A is electrically connected to the fingerprint recognition electrode blocks 211 in the same row and same column of different fingerprint recognition electrode block groups 210 in one column, or connected to the fingerprint recognition electrode blocks 211 in different rows and different columns of different fingerprint recognition electrode block groups 210 in one column. For example, one fingerprint recognition signal line 221 includes $N_1$ first fingerprint recognition signal line sections 221A and one second fingerprint recognition signal line section 221B. In this case, a $1^{st}$ first fingerprint recognition signal line section 221A is electrically connected to the fingerprint recognition electrode block 211 in the $1^{st}$ row and $2^{nd}$ column of the fingerprint recognition electrode block group 210 in the $1^{st}$ row and $1^{st}$ column, to the fingerprint recognition electrode block 211 in the $1^{st}$ row and $2^{nd}$ column of the fingerprint recognition electrode block group 210 in the $2^{nd}$ row and $1^{st}$ column, and to the fingerprint recognition electrode block 211 in the $1^{st}$ row and $n_1^{th}$ column of the fingerprint recognition electrode block group 210 in the $M_1^{th}$ row and $1^{st}$ column. A $2^{nd}$ first fingerprint recognition signal line section 221A is electrically connected to the fingerprint recognition electrode block 211 in the $1^{st}$ row and $2^{nd}$ column of the fingerprint recognition electrode block group 210 in the $1^{st}$ row and $2^{nd}$ column, to the fingerprint recognition electrode block 211 in the $1^{st}$ row and $2^{nd}$ column of the fingerprint recognition electrode block group 210 in the $2^{nd}$ row and $2^{nd}$ column, and to the fingerprint recognition electrode block 211 in the $1^{st}$ row and $n_1^{th}$ column of the fingerprint recognition electrode block group 210 in the $M_1^{th}$ row and $2^{nd}$ column. An $N_1^{th}$ first fingerprint recognition signal line section 221A is electrically connected to the fingerprint recognition electrode block 211 in the $1^{st}$ row and $2^{nd}$ column of the fingerprint recognition electrode block group 210 in the $1^{st}$ row and $N_1^{th}$ column, to the fingerprint recognition electrode block 211 in the $1^{st}$ row and $2^{nd}$ column of the fingerprint recognition electrode block group 210 in the $2^{nd}$ row and $N_1^{th}$ column, and to the fingerprint recognition electrode block 211 in the $1^{st}$ row and $n_1^{th}$ column of the fingerprint recognition electrode block group 210 in the $M_1^{th}$ row and $N_1^{th}$ column.

Figure 5:
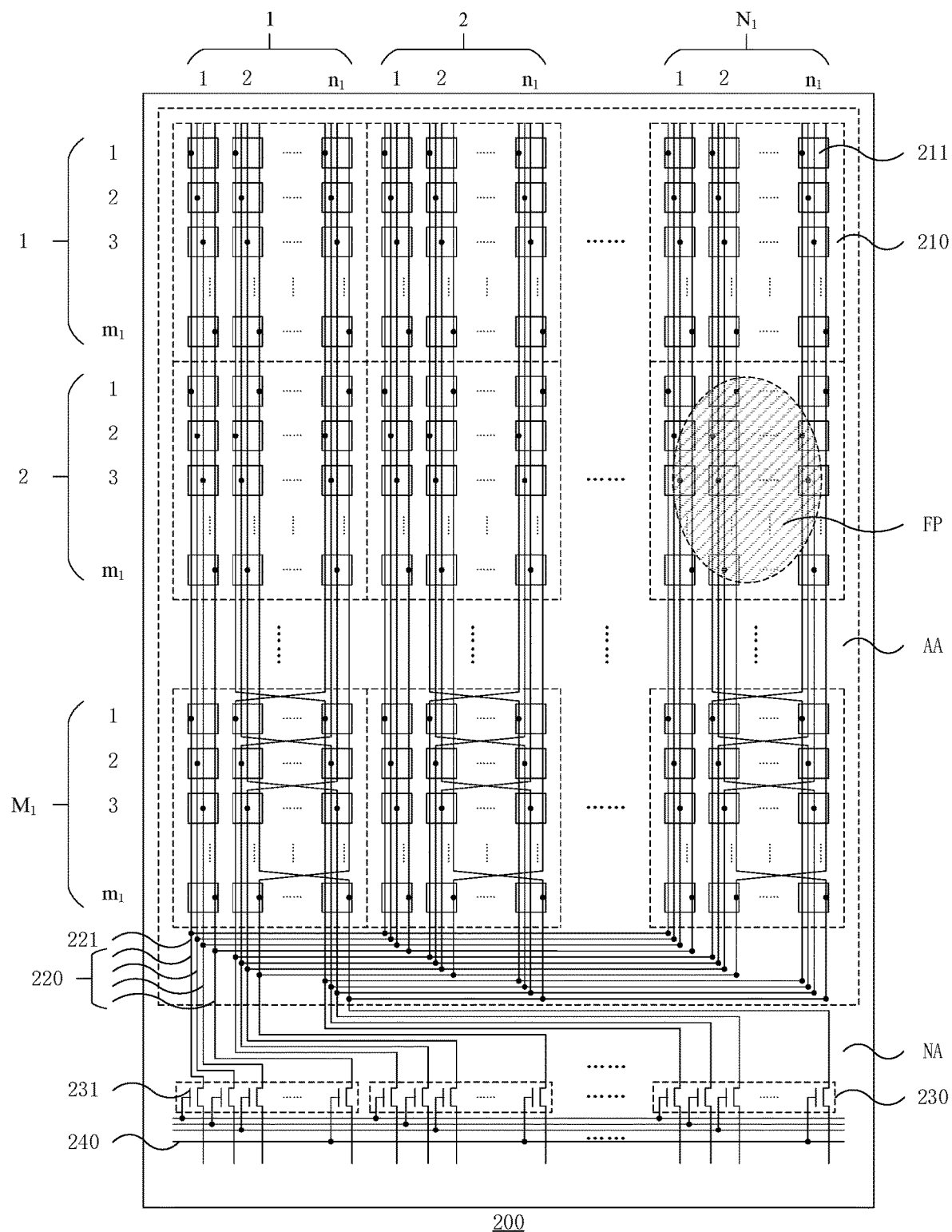
FIG. 5 is a schematic diagram illustrating a fingerprint recognition on a display panel according to an embodiment of the present disclosure.
Figure 6:
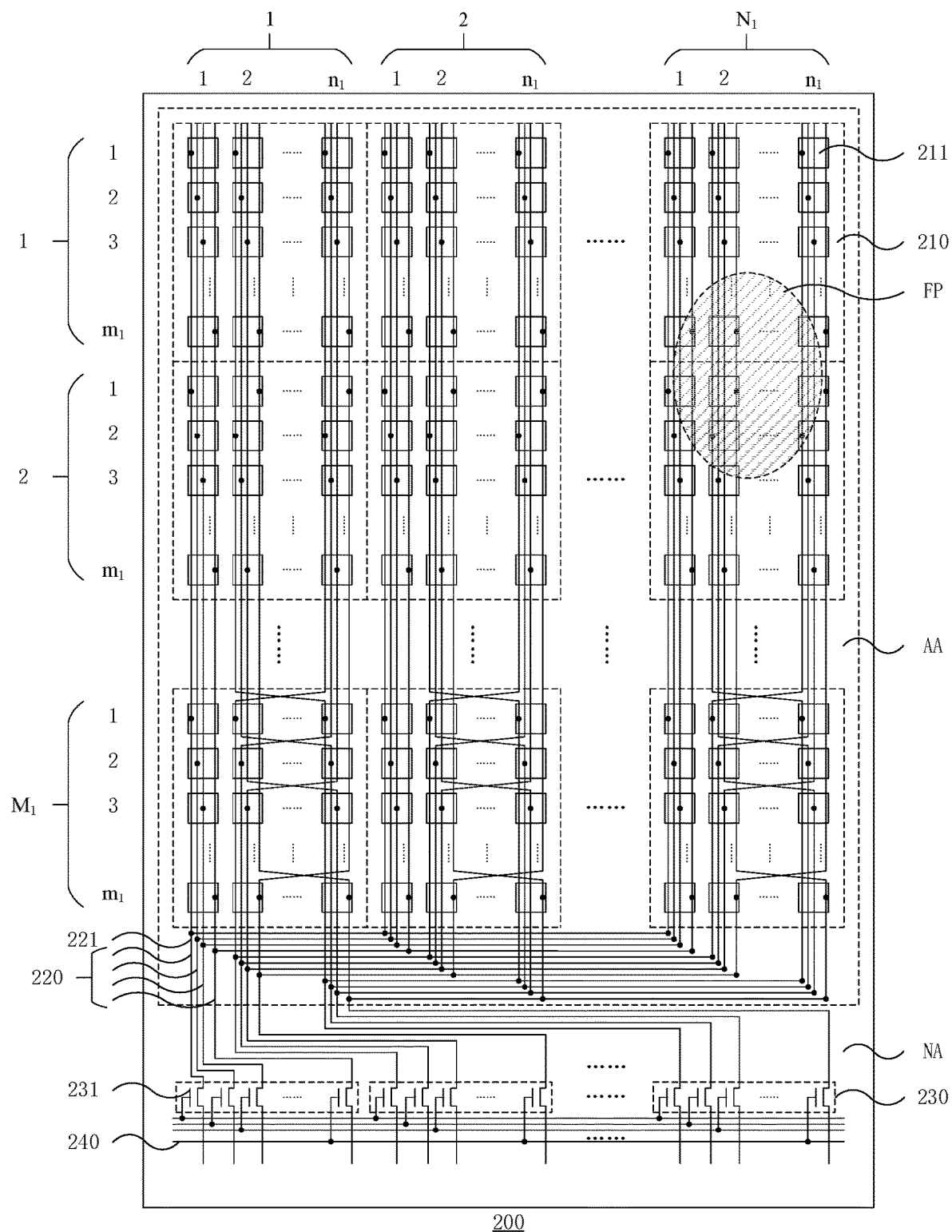
FIG. 6 is a schematic diagram illustrating another fingerprint recognition on a display panel according to an embodiment of the present disclosure.

FIG. 5 is a schematic diagram illustrating a fingerprint recognition on a display panel according to an embodiment of the present disclosure. FIG. 6 is a schematic diagram illustrating another fingerprint recognition on a display panel according to an embodiment of the present disclosure.

As shown in FIG. 5, an area where a finger FP presses against the display panel 200 is smaller than or equal to an area of a fingerprint recognition electrode block group 210. When the finger FP presses against one fingerprint recognition electrode block group 210, at most $m_1 \times n_1$ fingerprint recognition electrode blocks 211 of this fingerprint recognition electrode block group 210 detect a fingerprint of the finger, and then transmit a fingerprint signal corresponding to the finger FP to the fingerprint recognition chip. The fingerprint recognition chip can determine a fingerprint feature of the finger FP and achieve fingerprint recognition. The fingerprint recognition electrode blocks 211 of multiple fingerprint recognition electrode block groups 210 share one fingerprint recognition signal line group 220, and, under this scenario, the fingerprint recognition chip cannot determine a position of the finger FP. However, this does not affect the fingerprint recognition chip determining the fingerprint feature of the finger FP and achieving fingerprint recognition.

As shown in FIG. 6, when the finger FP presses against two adjacent fingerprint recognition electrode block groups 210, at most $m_1 \times n_1$ fingerprint recognition electrode blocks 211 in different rows and columns of the two fingerprint recognition electrode block groups 210 detect the fingerprint of the finger EP, and transmit a fingerprint signal corresponding to the finger FP to the fingerprint recognition chip. Similarly, during a fingerprint recognition process, it is only needed to recognize the corresponding feature of the finger FP without determining the position of the finger FP.

Figure 7:
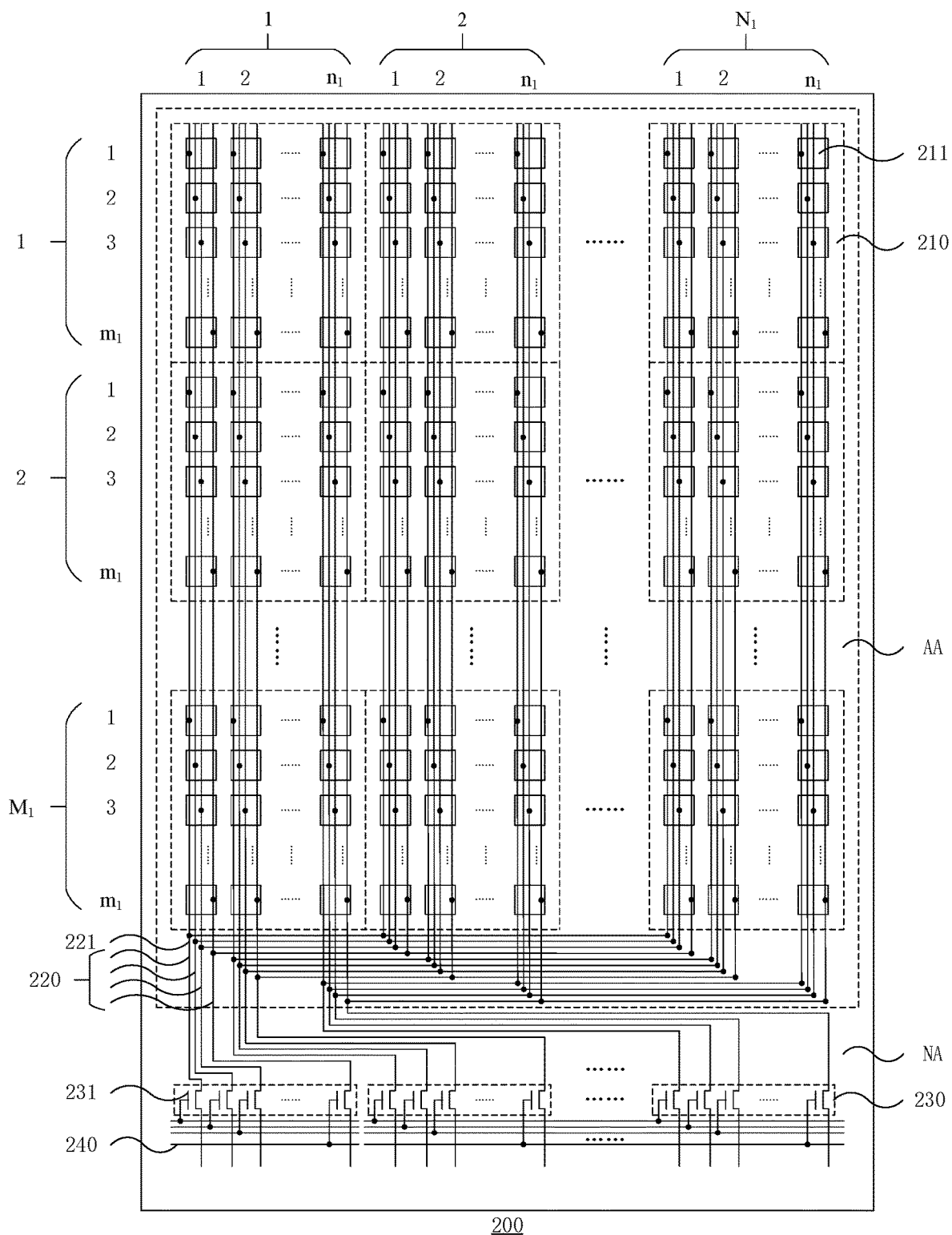
FIG. 7 is a structural schematic diagram of another display panel according to an embodiment of the present disclosure.

FIG. 7 is a structural schematic diagram of another display panel according to an embodiment of the present disclosure As shown in FIG. 7, $x_1=x_2$ and $y_1=y_2$.

In this embodiment of the present disclosure, the fingerprint recognition electrode block 211 in an $x_1^{th}$ row and $y_1^{th}$ column of the fingerprint recognition electrode block group 210 in an $X_1^{th}$ row and $Y_1^{th}$ column is electrically connected to the fingerprint recognition electrode block 211 in an $x_1^{th}$ row and $y_1^{th}$ column of the fingerprint recognition electrode block group 210 in an $X_2^{th}$ row and $Y_2^{th}$ column via one fingerprint recognition signal line 221. For example, the fingerprint recognition electrode block 211 in a $1^{st}$ row and $1^{st}$ column of the fingerprint recognition electrode block group 210 in a $1^{st}$ row and $1^{st}$ column is electrically connected to the fingerprint recognition electrode block 211 in a $1^{st}$ row and $1^{st}$ column of the fingerprint recognition electrode block group 210 in a $1^{st}$ row and $2^{nd}$ column via one fingerprint recognition signal line 221; and the fingerprint recognition electrode block 211 in a $1^{st}$ row and $2^{nd}$ column of the fingerprint recognition electrode block group 210 in the $1^{st}$ row and $1^{st}$ column is electrically connected to the fingerprint recognition electrode block 211 in a $1^{st}$ row and $2^{nd}$ column of the fingerprint recognition electrode block group 210 in the $1^{st}$ row and $2^{nd}$ column via one fingerprint recognition signal line 221. When the finger FP presses against the fingerprint recognition electrode block group 210 in the $1^{st}$ row and $1^{st}$ column and the fingerprint recognition electrode block group 210 in the $1^{st}$ row and $2^{nd}$ column, at most one of the fingerprint recognition electrode blocks 211 in a same row and same column of the fingerprint recognition electrode block group 210 in the $1^{st}$ row and $1^{st}$ column and the fingerprint recognition electrode block group 210 in the $1^{st}$ row and $2^{nd}$ column detects the fingerprint of the finger FP, and then transmits a fingerprint signal corresponding to the finger FP to the fingerprint recognition chip via one fingerprint recognition signal line 221. Therefore, at most $m_1 \times n_1$ fingerprint recognition electrode blocks 211 in different rows and columns of the two fingerprint recognition electrode block groups 210 detect the fingerprint of the finger FP, and respectively transmit the fingerprint signal corresponding to the finger FP to the fingerprint recognition chip via respective fingerprint recognition signal lines 221, so as to achieve fingerprint recognition.

As shown in FIG. 3 and FIG. 7, the display area AA is provided with fingerprint recognition electrode block groups 210 arranged in multiple rows and multiple columns. One column of fingerprint recognition electrode block groups 210 extend in a first direction, and one row of fingerprint recognition signal line sections 221A extend in a second direction. One fingerprint recognition signal line 221 includes: $N_1$ first fingerprint recognition signal line sections 221A and one second fingerprint recognition signal line section 221B. For example, a $1^{st}$ first fingerprint recognition signal line section 221A is electrically connected to the fingerprint recognition electrode block 211 in a $1^{st}$ row and $1^{st}$ column of the fingerprint recognition electrode block group 210 in a $1^{st}$ column, a $2^{nd}$ first fingerprint recognition signal line section 221A is electrically connected to the fingerprint recognition electrode block 211 in a $1^{st}$ row and $1^{st}$ column of the fingerprint recognition electrode block group 210 in a $2^{nd}$ column, and an $N_1^{th}$ first fingerprint recognition signal line section 221A is electrically connected to the fingerprint recognition electrode block 211 in a $1^{st}$ row and $1^{st}$ column of the fingerprint recognition electrode block group 210 in an $N_1^{th}$ column. Each of the above-mentioned $N_1$ first fingerprint recognition signal line sections 221A extends in the first direction. One second fingerprint recognition signal line section 221B is electrically connected to the above-mentioned $N_1$ fingerprint recognition signal line sections 221A. This second fingerprint recognition signal line section 221B extends in the second direction.

As shown in FIG. 7, the display panel 200 is provided with $n_1$ fingerprint recognition signal line groups 220, and each fingerprint recognition signal line group 220 includes $m_1$ fingerprint recognition signal lines 221. The fingerprint recognition electrode block 211 in the $x_1^{th}$ row and $y_1^{th}$ column of each fingerprint recognition electrode block group 210 is electrically connected to the fingerprint recognition electrode block 211 in the $x_1^{th}$ row and $y_1^{th}$ column of any other fingerprint recognition electrode block group 210. Multiple fingerprint recognition signal lines 221 that are electrically connected to a $j^{th}$ column of fingerprint recognition electrode blocks 211 in one fingerprint recognition electrode block group 210 belong to a $j^{th}$ fingerprint recognition signal line group 220. Multiple fingerprint recognition signal lines 221 that are connected to an $i^{th}$ of fingerprint recognition electrode blocks 211 in one fingerprint recognition electrode block group 210 are each $i^{th}$ fingerprint recognition signal lines 221 in different fingerprint recognition signal line groups 220. Here, $j \leq n_1$ and $i \leq m_1$. The fingerprint recognition electrode block 211 in an $x_1^{th}$ row and y1 column in each fingerprint recognition electrode block group 210 is electrically connected to an $x_1^{th}$ fingerprint recognition signal line 221 in a $y_1^{th}$ fingerprint recognition signal line group 220.

In this embodiment of the present disclosure, the fingerprint recognition electrode block 211 in the $x_1^{th}$ row and $y_1^{th}$ column of each fingerprint recognition electrode block group 210 is electrically connected to the fingerprint recognition electrode block 211 in the $x_1^{th}$ row and $y_1^{th}$ column of any other fingerprint recognition electrode block group 210. For example, the fingerprint recognition electrode block 211 in the $1^{st}$ row and $2^{nd}$ column of each fingerprint recognition electrode block group 210 is electrically connected to the fingerprint recognition electrode block 211 in the $1^{st}$ row and $2^{nd}$ column of any other fingerprint recognition electrode block group 210. Multiple fingerprint recognition electrode blocks 211 in a same row and same column of the $M_1 \times N_1$ fingerprint recognition electrode block groups 210 are connected to the fingerprint recognition chip via one fingerprint recognition signal line 221. Thus, compared to a case in which the electrode block groups 210 are electrically connected to the fingerprint recognition chip via multiple fingerprint recognition signal lines 221, this embodiment of the present disclosure can reduce the number of fingerprint recognition signal lines 221 and the number of terminals of the fingerprint recognition chip. Here, one fingerprint recognition electrode block group 210 has a larger size in the column direction or in the row direction than one fingerprint. The fingerprint is located on one fingerprint recognition electrode block group 210 or multiple adjacent fingerprint recognition electrode block groups 210. At most one of the fingerprint recognition electrode blocks 211 in the same row and same column of the $M_1 \times N_1$ fingerprint recognition electrode block groups 210 detects the fingerprint, and this fingerprint recognition electrode block 211 transmits a signal corresponding to the fingerprint via one fingerprint recognition signal line 221. In this way, a scenario is avoided whereby more than one fingerprint recognition electrode block 211 detects the fingerprint and then transmits more than one signal corresponding to the fingerprint via one fingerprint recognition signal line 221, which would result in crosstalk. The fingerprint recognition electrode block 211 in the $x_1^{th}$ row and $y_1^{th}$ column of each fingerprint recognition electrode block group 210 is electrically connected to the $x_1^{th}$ fingerprint recognition signal line 221 of the $y_1^{th}$ fingerprint recognition signal line group 220. For example, the fingerprint recognition electrode block 211 in the $1^{st}$ row and $2^{nd}$ column of each fingerprint recognition electrode block group 210 is electrically connected to the $1^{st}$ fingerprint recognition signal line 221 of the $2^{nd}$ fingerprint recognition signal line group 220. At most one of the fingerprint recognition electrode blocks 211 in the $x_1^{th}$ row and $y_1^{th}$ column of the $M_1 \times N_1$ fingerprint recognition electrode block groups 210 detects the fingerprint, and this fingerprint recognition electrode block 211 transmits the signal corresponding to the fingerprint via the $x_1^{th}$ fingerprint recognition signal line 221 of the $y_1^{th}$ fingerprint recognition signal line group 220. For example, at most one of the fingerprint recognition electrode blocks 211 in $1^{st}$ row and $2^{nd}$ column of the $M_1 \times N_1$ fingerprint recognition electrode block groups 210 detects the fingerprint, and this fingerprint recognition electrode block 211 transmits the signal corresponding to the fingerprint via the $1^{st}$ fingerprint recognition signal line 221 of the $2^{nd}$ fingerprint recognition signal line group 220. The fingerprint recognition electrode block group 210 includes fingerprint recognition electrode blocks 211 arranged in $m_1$ rows and $n_1$ columns. Each fingerprint recognition signal line group 220 of $n_1$ fingerprint recognition signal line groups 220 includes $m_1$ fingerprint recognition signal lines 221. At most $m_1 \times n_1$ fingerprint recognition electrode blocks 211 detect the fingerprint, and then transmit the signal corresponding to the fingerprint via $m_1 \times n_1$ fingerprint recognition signal lines 221, thereby achieving fingerprint recognition.

As shown in FIG. 7, the display panel 200 includes $n_1$ transistor groups 230, and each transistor group 230 includes $m_1$ switch transistors 231. The $m_1$ switch transistors 231 corresponding to the $m_1$ fingerprint recognition signal lines 221 of a $i^{th}$ fingerprint recognition signal line group 220 belong to a $i^{th}$ transistor group 230. The switch transistor 231 corresponding to the $i^{th}$ fingerprint recognition signal line 221 of one fingerprint recognition signal line group 220 is an $i^{th}$ switch transistor 231. An $x_1^{th}$ fingerprint recognition signal line 221 of a $y_1^{th}$ fingerprint recognition signal line group 220 is electrically connected to a first electrode of the $x_1^{th}$ switch transistor 231 of the $y_1^{th}$ transistor group 230.

In this embodiment of the present disclosure, the fingerprint recognition electrode block 211 in the $x_1^{th}$ row and $y_1^{th}$ column of each fingerprint recognition electrode block group 210 is electrically connected to the $x_1^{th}$ fingerprint recognition signal line 221 of the $y_1^{th}$ fingerprint recognition signal line group 220. The $x_1^{th}$ fingerprint recognition signal line 221 of the $y_1^{th}$ fingerprint recognition signal line group 220 is electrically connected to a first electrode of the $x_1^{th}$ switch transistor 231 of the $y_1^{th}$ transistor group 230. For example, the fingerprint recognition electrode block 211 in a $1^{st}$ row and $2^{nd}$ column of each fingerprint recognition electrode block group 210 is electrically connected to the $1^{st}$ fingerprint recognition signal line 221 of the $2^{nd}$ fingerprint recognition signal line group 220, and the $1^{st}$ fingerprint recognition signal line 221 of the $2^{nd}$ fingerprint recognition signal line group 220 is electrically connected to the $1^{st}$ switch transistor 231 of the $2^{nd}$ transistor group 230. Here, one fingerprint recognition electrode block group 210 has a larger size in the column direction or in the row direction than one fingerprint. The fingerprint is located on one fingerprint recognition electrode block group 210 or multiple adjacent fingerprint recognition electrode block groups 210. At most one of the fingerprint recognition electrode blocks 211 in the $x_1^{th}$ rows and $y_1^{th}$ columns of the $M_1 \times N_1$ fingerprint recognition electrode block groups 210 detects the fingerprint, and this fingerprint recognition electrode block 211 transmits a signal corresponding to the fingerprint to the $x_1^{th}$ switch transistor 231 of the $y_1^{th}$ transistor group 230 via the $x_1^{th}$ fingerprint recognition signal line 221 of the $y_1^{th}$ fingerprint recognition signal line group 220. For example, at most one of the fingerprint recognition electrode blocks 211 in the $1^{st}$ rows and $2^{nd}$ columns of the $M_1 \times N_1$ fingerprint recognition electrode block groups 210 detects the fingerprint, and this fingerprint recognition electrode block 211 transmits the signal corresponding to the fingerprint to the $1^{st}$ switch transistor 231 of the $2^{nd}$ transistor group 230 via the first fingerprint recognition signal line 221 of the $2^{nd}$ fingerprint recognition signal line group 220. The fingerprint recognition electrode block group 210 includes fingerprint recognition electrode blocks 211 arranged in $m_1$ rows and $n_1$ columns. Each fingerprint recognition signal line group 220 of $n_1$ fingerprint recognition signal line groups 220 includes $m_1$ fingerprint recognition signal lines 221. Each transistor group 230 of $n_1$ transistor groups 230 includes $m_1$ switch transistors 231. At most $m_1 \times n_1$ fingerprint recognition electrode blocks 211 detect the fingerprint, and then transmit the signal corresponding to the fingerprint to $m_1 \times n_1$ switch transistors 231 via $m_1 \times n_1$ fingerprint recognition signal lines 221. Within a period, a first part of the $m_1 \times n_1$ switch transistors 231 are turned on and the remaining part of the $m_1 \times n_1$ switch transistors 231 are turned off, so that the signal transmitted by the fingerprint recognition signal line 221 electrically connected to the first part of the $m_1 \times n_1$ switch transistors 231 reaches the fingerprint recognition chip. In another period, a second part of the $m_1 \times n_1$ switch transistors 231 are turned on and the remaining part of the $m_1 \times n_1$ switch transistors 231 are turned off, so that the signal transmitted by the fingerprint recognition signal line 221 electrically connected to the second part of the $m_1 \times n_1$ switch transistors 231 reaches the fingerprint recognition chip. The signals transmitted by the fingerprint recognition signal lines 221 connected to each part of the first part of the $m_1 \times n_1$ switch transistors 231 and the second part of the $m_1 \times n_1$ switch transistors 231 reach a same terminal of the fingerprint recognition chip in different time periods. Thus, compared to a case in which signals reach different terminals of the fingerprint recognition chip in a same time period, this embodiment of the present disclosure can reduce the number of terminals of the fingerprint recognition chip.

As shown in FIG. 7, the display panel 200 includes $m_1$ control signal lines 240, and the $m_1$ control signal lines 240 are electrically connected to control electrodes of $m_1$ switch transistors 231 of one transistor group 230 in one-to-one correspondence.

In this embodiment, $m_1$ control signal lines 240 are electrically connected to control electrodes of $m_1$ switch transistors 231 of one transistor group 230 in one-to-one correspondence. The control electrode of an $i^{th}$ switch transistor 231 of this one transistor group 230 is electrically connected to an $i^{th}$ control signal line 240 of the $m_1$ control signal lines 240. For example, the control electrode of a $1^{st}$ switch transistor 231 of this one transistor group 230 is electrically connected to a $1^{st}$ control signal line 240 of the $m_1$ control signal lines 240. The control electrode of an $m_1^{th}$ switch transistor 231 of this one transistor group 230 is electrically connected to an $m_1^{th}$ control signal line 240 of $m_1$ control signal lines 240. In a $1^{st}$ period, the $1^{st}$ control signal line 240 of the $m_1$ control signal lines 240 transmits a turned-on signal, and the $1^{st}$ switch transistor 231 of this one transistor group 230 is turned on while other switch transistors 231 of this one transistor group 230 are turned off, so that a signal transmitted by the fingerprint recognition signal line 221 electrically connected to the $1^{st}$ switch transistor 231 reaches the fingerprint recognition chip. In an $m_1^{th}$ period, the $m_1^{th}$ control signal line 240 of the $m_1$ control signal lines 240 transmits a turned-on signal, and the $m_1^{th}$ switch transistor 231 of this one transistor group 230 is turned on while other switch transistors 231 of this one transistor group 230 are turned off, so that a signal transmitted by the fingerprint recognition signal line 221 electrically connected to the $m_1^{th}$ switch transistor 231 reaches the fingerprint recognition chip. Signals transmitted by the respective fingerprint recognition signal lines 221 electrically connected to the $m_1$ switch transistors 231 of this one transistor group 230 reach a same terminal of the fingerprint recognition chip at different periods. Thus, compared to a case in which signals reach different terminals of the fingerprint recognition chip in the same period, this embodiment of the present disclosure can reduce the number of terminals of the fingerprint recognition chip.

Figure 8:
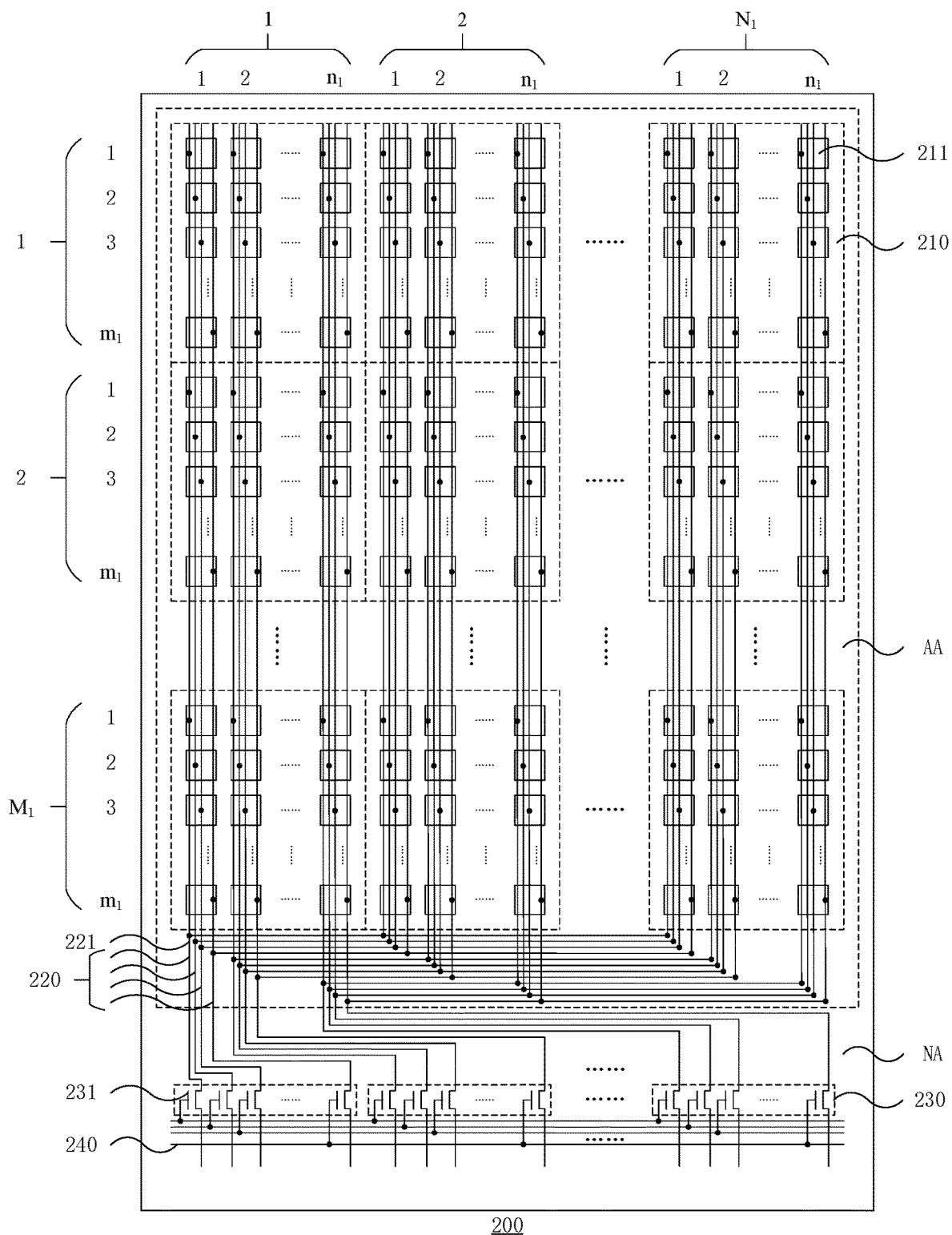
FIG. 8 is a structural schematic diagram of still another display panel according to an embodiment of the present disclosure.

FIG. 8 is a structural schematic diagram of still another display panel according to an embodiment of the present disclosure.

As shown in FIG. 8, the control electrode of the $i^{th}$ switch transistor 231 of each transistor group 230 is electrically connected to a same control signal line 240, which is the $i^{th}$ control signal line 240.

In this embodiment, the control electrode of the $i^{th}$ switch transistor 231 of each transistor group 230 is electrically connected to the same control signal line 240, which is the $i^{th}$ control signal line 240. For example, the control electrode of the $1^{st}$ switch transistor 231 of each transistor group 230 is electrically connected to the $1^{st}$ control signal line 240. The control electrode of the $m_1^{th}$ switch transistor 231 of each transistor group 230 is electrically connected to the $m_1^{th}$ control signal line 240. In a $1^{st}$ period, the $1^{st}$ control signal line 240 transmits a turned-on signal, and the $1^{st}$ switch transistor 231 of each transistor group 230 is turned on while other switch transistors 231 of each transistor group 230 are turned off, so that a signal transmitted by the fingerprint recognition signal line 221 electrically connected to the $1^{st}$ switch transistor 231 reaches the fingerprint recognition chip. In an $m_1^{th}$ period, the $m_1^{th}$ control signal line 240 transmits a turned-on signal, and the $m_1^{th}$ switch transistor 231 of each transistor group 230 is turned on while other switch transistors 231 of each transistor group 230 are turned off, so that a signal transmitted by the fingerprint recognition signal line 221 electrically connected to the $m_1^{th}$ switch transistor 231 reaches the fingerprint recognition chip. Signals transmitted by the respective fingerprint recognition signal lines 221 electrically connected to the $m_1$ switch transistors 231 of each transistor group 230 reach a same terminal of the fingerprint recognition chip at different periods. Thus, compared to a case in which signals reach different terminals of the fingerprint recognition chip in a same period, this embodiment of the present disclosure can reduce the number of terminals of the fingerprint recognition chip. The control electrode of the $i^{th}$ switch transistor 231 of $n_1$ transistor groups 230 is connected to a same control signal line 240, and this control signal line 240 is electrically connected to the fingerprint recognition chip. Thus, compared to a case in which the control electrodes of the respective $i^{th}$ switch transistors 231 of $n_1$ transistor groups 230 are connected to $n_1$ control signal lines 240, this embodiment of the present disclosure can reduce the number of control signal lines 240 and the number of terminals of the fingerprint recognition chip.

Figure 9:
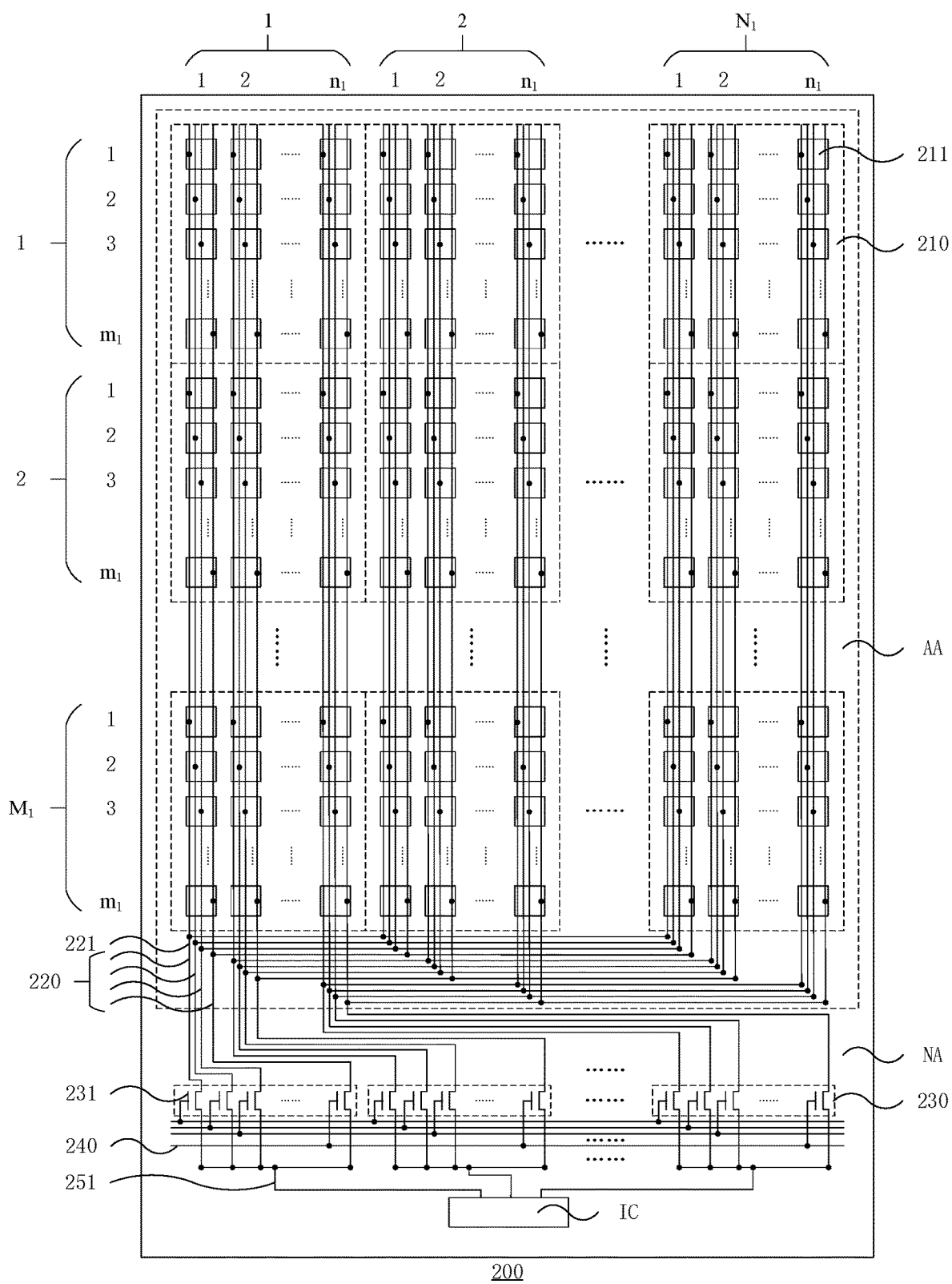
FIG. 9 is a structural schematic diagram of yet another display panel according to an embodiment of the present disclosure.

FIG. 9 is a structural schematic diagram of yet another display panel according to an embodiment of the present disclosure.

As shown in FIG. 9, the display panel 200 includes a fingerprint recognition chip IC. The fingerprint recognition chip IC includes $n_1$ fingerprint recognition signal terminals 251. One fingerprint recognition signal terminal 251 is electrically connected to second electrodes of all the switch transistors 231 of one transistor group 230.

In this embodiment of the present disclosure, one fingerprint recognition signal terminal 251 is electrically connected to second electrodes of all the switch transistors 231 of one transistor group 230. This one transistor group 230 includes $m_1$ switch transistor 231, and the $m_1$ switch transistors 231 are electrically connected to one fingerprint recognition signal terminal 251. The fingerprint recognition chip IC includes $n_1$ fingerprint recognition signal terminals 251. The fingerprint recognition signal terminal 251 corresponding to a $j^{th}$ transistor group 230 is a $j^{th}$ fingerprint recognition signal terminal 251. The $j^{th}$ fingerprint recognition signal terminal 251 is electrically connected to the second electrodes of all the switch transistors 231 of the $j^{th}$ transistor group 230. For example, the $1^{st}$ fingerprint recognition signal terminal 251 is electrically connected to the second electrodes of all the switch transistors 231 of the $1^{st}$ transistor group 230. The $n_1^{th}$ fingerprint recognition signal terminal 251 is electrically connected to the second electrodes of all the switch transistors 231 of the $n_1^{th}$ transistor group 230. Each transistor group 230 of $n_1$ transistor groups 230 includes $m_1$ switch transistors 231, and $n_1$ transistor groups 230 includes a total of $n_1 \times m_1$ switch transistors 231. The $n_1 \times m_1$ switch transistors 231 are connected to $n_1$ fingerprint recognition signal terminals 251. Thus, compared to a case in which they are connected to $n_1 \times m_1$ fingerprint recognition signal terminals 251, this embodiment of the present disclosure can reduce the number of fingerprint recognition signal terminals 251.

Figure 10:
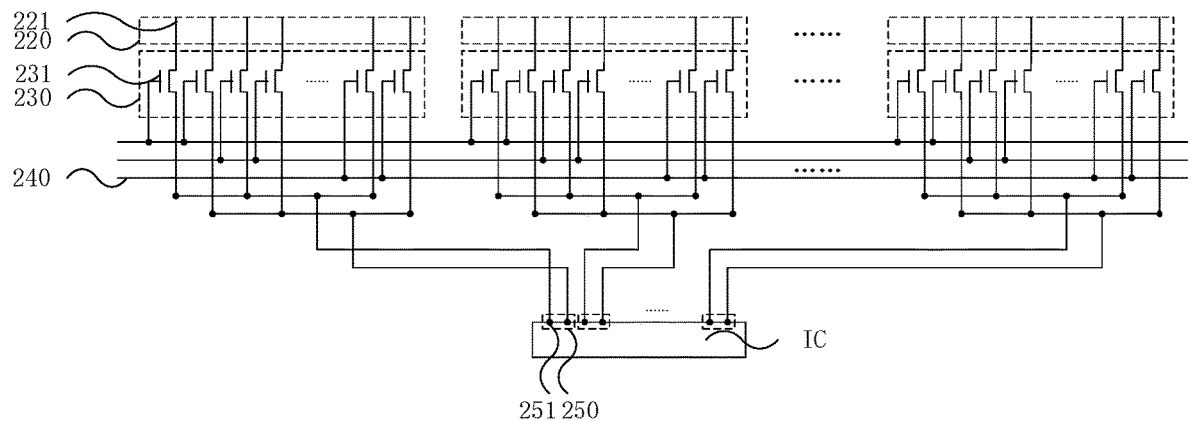
FIG. 10 is a structural schematic diagram of yet another display panel according to an embodiment of the present disclosure.

FIG. 10 is a structural schematic diagram of yet another display panel according to an embodiment of the present disclosure.

As shown in FIG. 8 and FIG. 10, $m_1$ is an even number. The display panel 200 includes a fingerprint recognition chip IC, and the fingerprint recognition chip IC includes $n_1$ fingerprint recognition signal terminal groups 250. Each fingerprint recognition signal terminal group 250 includes at least two fingerprint recognition signal terminals 251. One of the two fingerprint recognition signal terminals 251 is electrically connected to the second electrodes of $m_1/2$ switch transistors 231 of one transistor group 230, and the other one of the two fingerprint recognition signal terminals 251 is electrically connected to the second electrodes of the other $m_1/2$ switch transistors 231 of the transistor group 230. The display panel 200 further includes $m_1/2$ control signal lines 240. The control electrodes of multiple switch transistors 231 of a same transistor group 230 electrically connected to a same fingerprint recognition signal terminal 251 are electrically connected to different control signal lines 240.

In this embodiment of the present disclosure, one of two fingerprint recognition signal terminals 251 of each fingerprint recognition signal terminal group 250 is electrically connected to the second electrodes of $m_1/2$ switch transistors 231 of one transistor group 230, and the other one of the two fingerprint recognition signal terminals 251 of the fingerprint recognition signal terminal group 250 is electrically connected to the second electrodes of the other $m_1/2$ switch transistors 231 of the transistor group 230. For example, one of two fingerprint recognition signal terminals 251 is electrically connected to the second electrodes of odd-numbered switch transistors 231 of one transistor group 230, and the other one of the two fingerprint recognition signal terminals 251 is electrically connected to the second electrodes of even-numbered switch transistors 231 of the transistor group 230. The fingerprint recognition chip IC includes $n_1$ fingerprint recognition signal terminal groups 250. The fingerprint recognition signal terminal group 250 corresponding to the $j^{th}$ transistor group 230 is the $j^{th}$ fingerprint recognition signal terminal group 250. At least two fingerprint recognition signal terminals 251 of the $j^{th}$ fingerprint recognition signal terminal group 250 are electrically connected to the second electrodes of all switch transistors 231 of the $j^{th}$ transistor group 230. For example, at least two fingerprint recognition signal terminals 251 of the $1^{st}$ fingerprint recognition signal terminal group 250 are electrically connected to the second electrodes of all switch transistors 231 of the $1^{st}$ transistor group 230. At least two fingerprint recognition signal terminals 251 of the $n_1^{th}$ fingerprint recognition signal terminal group 250 are electrically connected to the second electrodes of all switch transistors 231 of the $n_1^{th}$ transistor group 230. Each transistor group 230 of $n_1$ transistor groups 230 includes $m_1$ switch transistors 231, and the $n_1$ transistor groups 230 totally include $n_1 \times m_1$ switch transistors 231. The $n_1 \times m_1$ switch transistors 231 are electrically connected to $2n_1$ fingerprint recognition signal terminals 251. Thus, compared to a case in which they are electrically connected to $n_1 \times m_1$ fingerprint recognition signal terminals 251, this embodiment of the present disclosure can reduce the number of fingerprint recognition signal terminals 251. The control electrodes of multiple switch transistors 231 of the same transistor group 230 electrically connected to the same fingerprint recognition signal terminal 251 are electrically connected to different control signal lines 240. Multiple switch transistors 231 of one transistor group 230 electrically connected to one fingerprint recognition signal terminal 251 are $m_1/2$ switch transistors 231, and the $m_1/2$ switch transistors 231 are electrically connected to $m_1/2$ control signal lines 240. Multiple switch transistors 231 of this one transistor group 230 electrically connected to the other fingerprint recognition signal terminal 251 are the other $m_1/2$ switch transistors 231, and the other $m_1/2$ switch transistors 231 are electrically connected to the $m_1/2$ control signal lines 240. Each of the $m_1/2$ control signal lines 240 transmits a turned-on signal. One of the $m_1/2$ switch transistors 231 is turned on and one of the other $m_1/2$ switch transistors 231 is turned on. The $m_1/2$ control signal lines 240 sequentially transmit $m_1/2$ turned-on signals in such a manner that $m_1$ switch transistors 231 of each transistor group 230 are turned on. Thus, compared to a case in which the control signal lines 240 transmit $m_1$ turned-on signals so as to turn on $m_1$ switch transistors 231 of each transistor group 230, this embodiment of the present disclosure can improve the fingerprint recognition rate.

Figure 11:
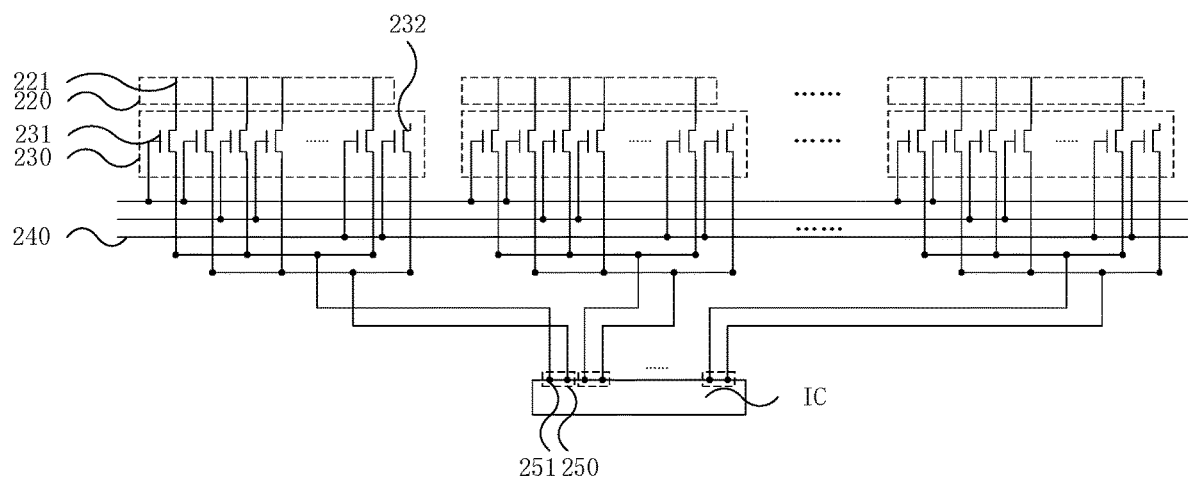
FIG. 11 is a structural schematic diagram of yet another display panel according to an embodiment of the present disclosure.

FIG. 11 is a structural schematic diagram of yet another display panel according to an embodiment of the present disclosure.

As shown in FIG. 8 and FIG. 11, $m_1$ is an odd number. Each transistor group 230 further includes a dummy transistor 232, and a first electrode of the dummy transistor 232 is suspended. The display panel 200 includes a fingerprint recognition chip IC, and the fingerprint recognition chip IC includes $n_1$ fingerprint recognition signal terminal groups 250. Each fingerprint recognition signal terminal group 250 includes at least two fingerprint recognition signal terminals 251. One of the two fingerprint recognition signal terminals 251 is electrically connected to second electrodes of $(m_1+1)/2$ switch transistors 231 of one transistor group 230, and the other one of the two fingerprint recognition signal terminals 251 is electrically connected to second electrodes of the other $((m_1+1)/2)-1$ switch transistors 231 of this one transistor group 230. The display panel 200 further includes $(m_1+1)/2$ control signal lines 240. Control electrodes of the switch transistor 231 and the dummy transistor 232 of a same transistor group 230 electrically connected to a same fingerprint recognition signal terminal 251 are electrically connected to different control signal lines 240.

In this embodiment of the present disclosure, one of two fingerprint recognition signal terminals 251 of each fingerprint recognition signal terminal group 250 is electrically connected to the second electrodes of $(m_1+1)/2$ switch transistors 231 of one transistor group 230, and the other one of the two fingerprint recognition signal terminals 250 of the fingerprint recognition signal terminal group 250 is electrically connected to the second electrodes of the other $((m_1+1)/2)-1$ switch transistors 231 and the dummy transistor 232 of this one transistor group 230. For example, one of two fingerprint recognition signal terminals 251 is electrically connected to the second electrodes of odd-numbered switch transistors 231 of one transistor group 230, and the other one of the two fingerprint recognition signal terminals 250 is electrically connected to the second electrodes of even-numbered switch transistors 231 and the dummy transistor 232 of this one transistor group 230. The fingerprint recognition chip IC includes $n_1$ fingerprint recognition signal terminal groups 250, and the fingerprint recognition signal terminal group 250 corresponding to a $j^{th}$ transistor group 230 is a $j^{th}$ fingerprint recognition signal terminal group 250. At least two fingerprint recognition signal terminals 251 of the $j^{th}$ fingerprint recognition signal terminal group 250 are electrically connected to the second electrodes of all switch transistors 231 and the dummy transistor 232 of the $j^{th}$ transistor group 230. For example, at least two fingerprint recognition signal terminals 251 of a $1^{st}$ fingerprint recognition signal terminal group 250 are electrically connected to the second electrodes of all switch transistors 231 and the dummy transistor 232 of a $1^{st}$ transistor group 230. At least two fingerprint recognition signal terminals 251 of an $n_1^{th}$ fingerprint recognition signal terminal group 250 are electrically connected to the second electrodes of all switch transistors 231 and the dummy transistor 232 of an $n_1^{th}$ transistor group 230. Each transistor group 230 of $n_1$ transistor groups 230 includes $m_1$ switch transistors 231, and the $n_1$ transistor groups 230 include $n_1 \times m_1$ switch transistors 231 in total. The $n_1 \times m_1$ switch transistors 231 are electrically connected to at least $2n_1$ fingerprint recognition signal terminals 251. The control transistors of the switch transistor 231 and the dummy transistor 232 of a same transistor group 230 electrically connected to a same fingerprint recognition signal terminal 251 are electrically connected to different control signal lines 240. The dummy transistor 232 is provided here to increase design flexibility of the fingerprint recognition signal line 221. The number of fingerprint recognition signal lines 221 of one fingerprint recognition signal line group 220 may be smaller than the number of switch transistors 231 and the dummy transistor 232 of one transistor group 230, or equal to the number of switch transistors 231 and the dummy transistor 232 of one transistor group 230. When the number of fingerprint recognition signal lines 221 of one fingerprint recognition signal line group 220 is smaller than the number of switch transistors 231 and the dummy transistor 232 of one transistor group 230, the dummy transistor 232 does not serve as a switch transistor 231 and is not electrically connected to the fingerprint recognition signal line 221. When the number of fingerprint recognition signal lines 221 of one fingerprint recognition signal line group 220 is equal to the number of switch transistors 231 and the dummy transistor 232 of one transistor group 230, the dummy transistor 232 serves as a switch transistor 231 and is electrically connected to the fingerprint recognition signal line 221. The number of fingerprint recognition signal lines 221 of one fingerprint recognition signal line group 220 can be flexibly adjusted according to actual conditions. Multiple switch transistors 231 of one transistor group 230 electrically connected to one fingerprint recognition signal terminal 251 are $(m_1+1)/2$ switch transistors 231, and the $(m_1+1)/2$ switch transistors 231 are electrically connected to $(m_1+1)/2$ control signal lines 240. Multiple switch transistors 231 of this one transistor group 230 electrically connected to another fingerprint recognition signal terminal 251 are $((m_1+1)/2)-1$ switch transistors 231, and the $((m_1+1)/2)-1$ switch transistors 231 and the dummy transistor 232 are electrically connected to the $(m_1+1)/2$ control signal lines 240. Each control signal line 240 of the $(m_1+1)/2$ control signal lines 240 transmits a turned-on signal. One of the $(m_1+1)/2$ switch transistors 231 is turned on, and one of the $((m_1+1)/2)-1$ switch transistors 231 is turned on. The $(m_1+1)/2$ control signal lines 240 sequentially transmit $(m_1+1)/2$ turned-on signals in such a manner that $m_1$ switch transistors 231 of each transistor group 230 are turned on. Thus, compared to a case in which they transmit $m_1$ turned-on signals in such a manner that $m_1$ switch transistors 231 of each transistor group 230 are turned on, this embodiment of the present disclosure can increase the fingerprint recognition rate.

Figure 12:
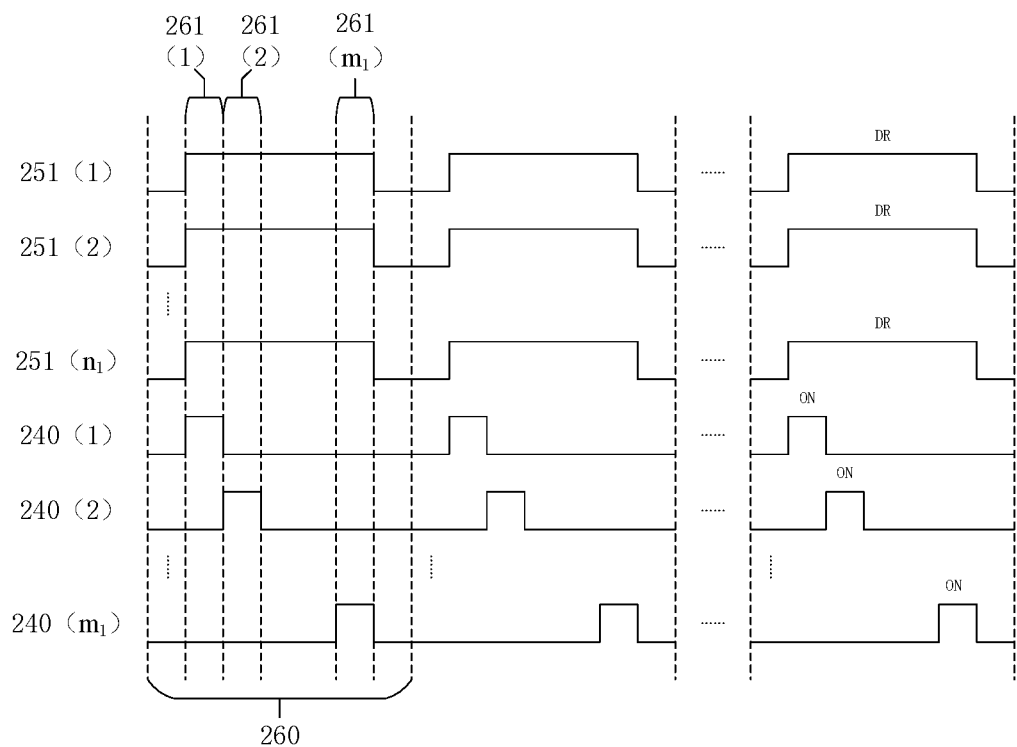
FIG. 12 is a time sequence diagram of a display panel according to an embodiment of the present disclosure.
Figure 13:
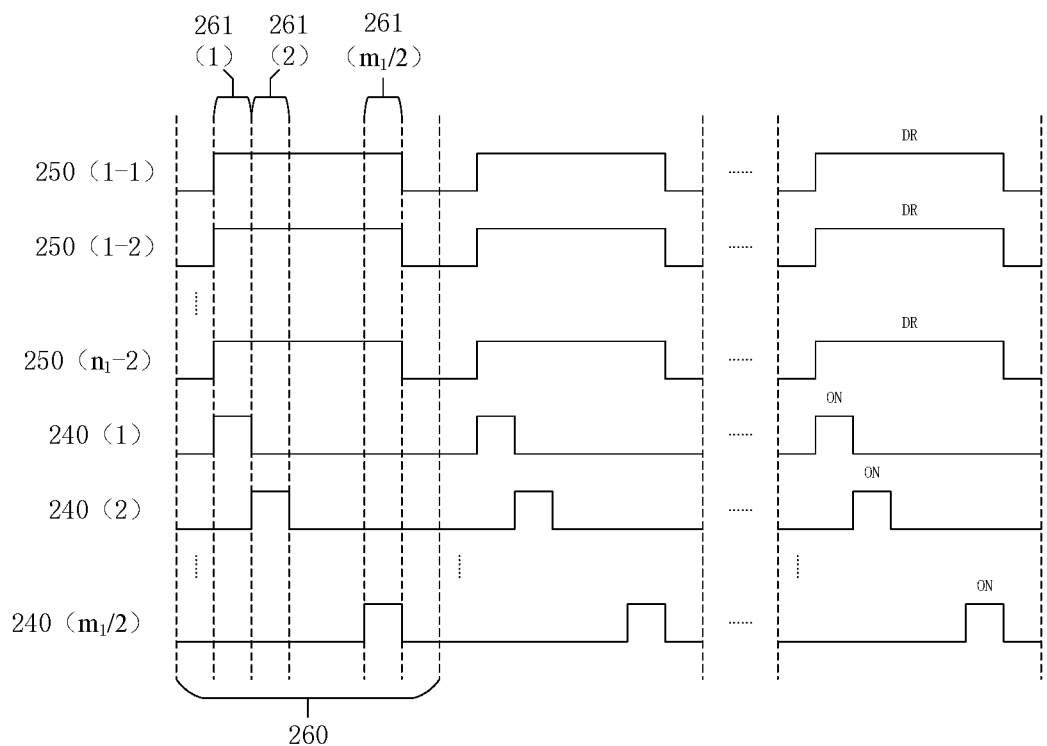
FIG. 13 is a time sequence diagram of another display panel according to an embodiment of the present disclosure.
Figure 14:
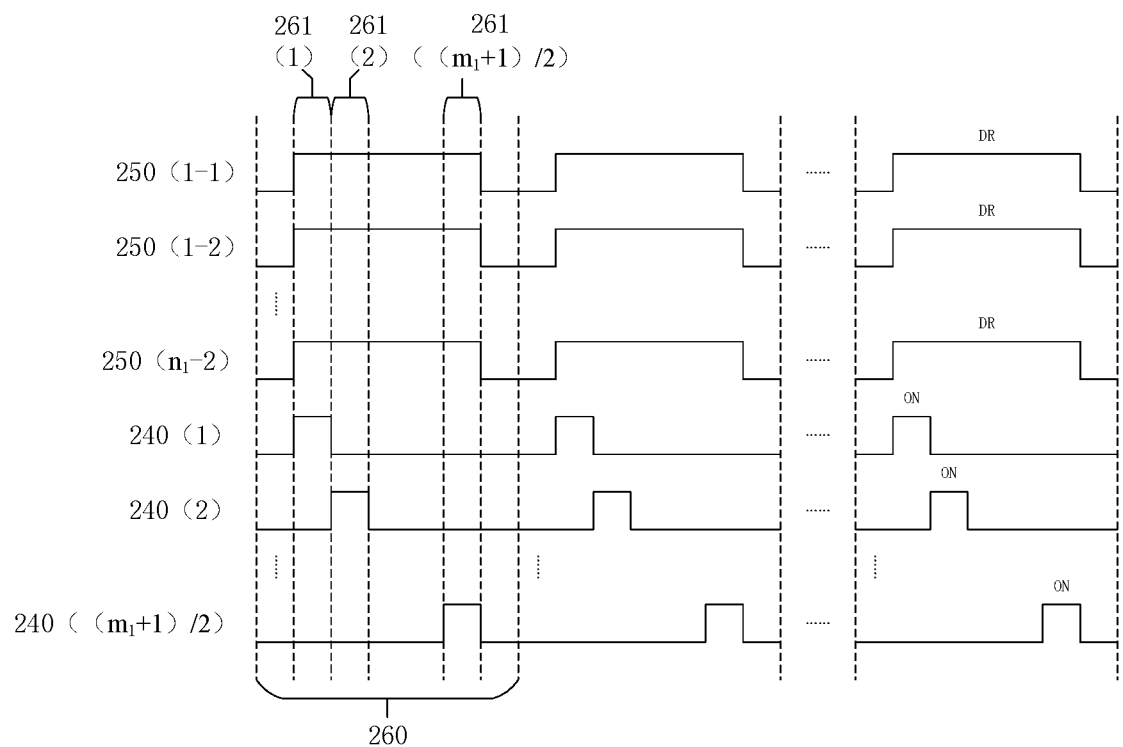
FIG. 14 is a time sequence diagram of still another display panel according to an embodiment of the present disclosure.

FIG. 12 is a time sequence diagram of a display panel according to an embodiment of the present disclosure. FIG. 13 is a time sequence diagram of another display panel according to an embodiment of the present disclosure. FIG. 14 is a time sequence diagram of still another display panel according to an embodiment of the present disclosure.

As shown in FIGS. 12 to 14, in one fingerprint recognition period 260, each control signal line 240 sequentially transmits a turned-on signal ON.

For example, in an embodiment of the present disclosure, all switch transistors 231 and the dummy transistor 232 of each transistor group 230 are NMOS transistors, and the turn-on signal ON is a high-level signal and the turned-off signal is of a low-level signal. It is also possible that all switch transistors 231 and the dummy transistor 232 of each transistor group 230 are PMOS transistors, and the turn-on signal ON is a low-level signal and the turned-off signal is a high-level signal.

As shown in FIG. 7 and FIG. 10, one fingerprint recognition signal terminal 251 is electrically connected to second electrodes of all switch transistors 231 of one transistor group 230. The control electrode of an $i^{th}$ switch transistor 231 of this one transistor group 230 is electrically connected to a same control signal line 240, and this control signal line 240 is an $i^{th}$ control signal line 240. For example, a $1^{st}$ control signal line 240 is electrically connected to the control electrode of a $1^{st}$ switch transistor 231 of this one transistor group 230. A $2^{nd}$ control signal line 240 is electrically connected to the control electrode of a $2^{nd}$ switch transistor 231 of this one transistor group 230. An $m_1^{th}$ control signal line 240 is electrically connected to the control electrode of an $m_1^{th}$ switch transistor 231 of this one transistor group 230. In one fingerprint recognition period 260, each of the control signal lines 240 sequentially transmits a turned-on signal ON. This one fingerprint recognition period 260 includes $m_1$ sub-periods 261 such as a sub-period 261, a $2^{nd}$ sub-period 261, . . . , an $m_1^{th}$ sub-period 261 and the like. In the $1^{st}$ sub-period 261, the $1^{st}$ control signal line 240 transmits a turned-on signal ON while the other control signal lines 240 do not transmit a turned-on signal ON, and the $1^{st}$ switch transistor 231 of this one transistor group 230 is turned on while the other switch transistors 231 of this one transistor group 230 are turned off. In the $2^{nd}$ sub-period 261, the $2^{nd}$ control signal line 240 transmits a turned-on signal ON while the other control signal lines 240 do not transmit a turned-on signal ON, and the $2^{nd}$ switch transistor 231 of this one transistor group 230 is turned on while the other switch transistors 231 of this one transistor group 230 are turned off. In the $m_1^{th}$ sub-period 261, the $m_1^{th}$ control signal line 240 transmits a turned-on signal ON while the other control signal lines 240 do not transmit a turned-on signal ON, and the $m_1^{th}$ switch transistor 231 of this one transistor group 230 is turned on while the other switch transistors 231 of this one transistor group 230 are turned off. Signals transmitted by the fingerprint recognition signal lines 221 electrically connected to the $m_1$ switch transistors 231 of this one transistor group 230 respectively reach a same terminal of the fingerprint recognition chip IC within the $m_1$ sub-periods 261. Thus, compared to a case in which the signals reach different terminals of the fingerprint recognition chip IC in a same sub-period as described above, this embodiment of the present disclosure can reduce the number of terminals of the fingerprint recognition chip IC.

As shown in FIGS. 8, 10 and 13, one of two fingerprint recognition signal terminals 251 of one fingerprint recognition signal terminal group 250 is electrically connected to the second electrodes of $m_1/2$ switch transistors 231 of one transistor group 230, and the other one of the two fingerprint recognition signal terminals 251 of this one fingerprint recognition signal terminal group 250 is electrically connected to the second electrodes of the other $m_1/2$ switch transistors 231 of this one transistor group 230. The control electrodes of multiple switch transistors 231 of a same transistor group 230 electrically connected to a same fingerprint recognition signal terminal 251 are electrically connected to different control signal lines 240. The control electrodes of $(i-1)^{th}$ and $i^{th}$ switch transistors 231 of this one transistor group 230 are electrically connected to a same control signal line 240, and this control signal line 240 is a $(i/2)^{th}$ control signal line 240. Here, i is an even number. For example, a $1^{st}$ control signal line 240 is electrically connected to the electrodes of $1^{st}$ and $2^{nd}$ switch transistors 231 of this one transistor group 230. A $2^{nd}$ control signal line 240 is electrically connected to the control electrodes of $3^{rd}$ and $4^{th}$ switch transistors 231 of this one transistor group 230. A $(m_1/2)^{th}$ control signal line 240 is electrically connected to the control electrodes of $(m_1-1)^{th}$ and $m_1^{th}$ switch transistors 231 of this one transistor group 230. In one fingerprint recognition period 260, each of $m_1/2$ control signal lines 240 sequentially transmits a turned-on signal ON. This one fingerprint recognition period 260 includes $m_1/2$ sub-periods 261 such as a $1^{st}$ sub-period 261, a $2^{nd}$ sub-period 261, a $(m_1/2)^{th}$ sub-period 261 and the like. In the sub-period 261, the $1^{st}$ control signal line 240 transmits a turned-on signal ON while the other control signal lines 240 do not transmit a turned-on signal ON, and the $1^{st}$ and $2^{nd}$ switch transistors 231 of this one transistor group 230 are turned on and the other switch transistor 231 of this one transistor group 230 are turned off. In the $2^{nd}$ sub-period 261, the $2^{nd}$ control signal line 240 transmits a turned-on signal ON while the other control signal lines 240 do not transmit a turned-on signal ON, and the $3^{rd}$ and $4^{th}$ switch transistors 231 of this one transistor group 230 are turned on and the other switch transistors 231 of this one transistor group 230 are turned off. In the $(m_1/2)^{th}$ sub-period 261, the $(m_1/2)^{th}$ control signal line 240 transmits a turned-on signal ON while the other control signal lines 240 do not transmit a turned-on signal ON, and $(m_1-1)^{th}$ and $m_1^{th}$ switch transistors 231 of this one transistor group 230 are turned on and the other switch transistors 231 of this one transistor group 230 are turned off. Signals transmitted by the fingerprint recognition signal lines 221 electrically connected to the $m_1$ switch transistors 231 of this one transistor group 230 respectively reach a same terminal of the fingerprint recognition chip IC respectively in the $m_1/2$ sub-periods 261. Thus, compared to a case in which the signals reach different terminals of the fingerprint recognition chip IC in a same sub-period as described above, this embodiment of the present disclosure can reduce the number of terminals of the fingerprint recognition chip IC.

As shown in FIGS. 8, 11, and 14, one of two fingerprint recognition signal terminals 251 of one fingerprint recognition signal terminal group 250 is electrically connected to the second electrodes of $(m_1+1)/2$ switch transistors 231 of one transistor group 230, and the other one of the two fingerprint recognition signal terminals 251 of this one fingerprint recognition signal terminal group 250 is electrically connected to the second electrodes of the other $((m_1+1)/2)-1$ switch transistors 231 and the dummy transistor 232 of this one transistor group 230. The control electrodes of the switch transistor 231 and the dummy transistor 232 of a same transistor group 230 electrically connected to a same fingerprint recognition signal terminal 251 are electrically connected to different control signal lines 240. The control electrodes of $(i-1)^{th}$ and $i^{th}$ switch transistors 231 of this one transistor group 230 are electrically connected to a same control signal line 240, or the control electrodes of the $(i-1)^{th}$ switch transistor 231 and the dummy transistor 232 of this one transistor group 230 are connected to a same control signal line 240, and this control signal line 240 is a $(i/2)^{th}$ control signal line 240. Here, i is an even number. For example, a $1^{st}$ control signal line 240 is electrically connected to the control electrodes of $1^{st}$ and $2^{nd}$ switch transistors 231 of this one transistor group 230. A $2^{nd}$ control signal line 240 is electrically connected to the control electrodes of $3^{rd}$ and $4^{th}$ switch transistors 231 of this one transistor group 230. A $(m_1/2)^{th}$ control signal line 240 is electrically connected to the control electrodes of an $m_1^{th}$ switch transistor 231 and the dummy transistor 232 of this one transistor group 230. In one fingerprint recognition period 260, each of $m_1/2$ control signal lines 240 sequentially transmits a turned-on signal ON. This one fingerprint recognition period 260 includes $m_1/2$ sub-periods 261 such as a $1^{st}$ sub-period 261, a $2^{nd}$ sub-period 261, . . . , a $(m_1/2)^{th}$ sub-period 261 and so on. In the $1^{st}$ sub-period 261, the $1^{st}$ control signal line 240 transmits a turned-on signal ON while the other control signal lines 240 do not transmit a turned-on signal ON, and the $1^{st}$ and $2^{nd}$ switch transistors 231 of this one transistor group 230 are turned on while the other switch transistors 231 are turned off. In the $2^{nd}$ sub-period 261, the $2^{nd}$ control signal line 240 transmits a turned-on signal ON while the other control signal lines 240 of this one transistor group 230 do not transmit a turned-on signal ON, and the $3^{rd}$ and $4^{th}$ switch transistors 231 of this one transistor group 230 are turned on while the other switch transistors 231 of this one transistor group 230 are turned off. In the $(m_1/2)^{th}$ sub-period 261, the $(m_1/2)^{th}$ control signal line 240 transmits a turned-on signal ON while the other control signal lines 240 do not transmit a turned-on signal ON, and the $m_1^{th}$ switch transistor 231 of this one transistor group 230 is turned on while the other switch transistors 231 of this one transistor group 230 are turned off. Signals transmitted by the fingerprint recognition signal lines 221 electrically connected to the $m_1$ switch transistors 231 of this one transistor group 230 reach a same terminal of the fingerprint recognition chip IC respectively in the $m_1/2$ sub-periods 261. Thus, compared to a case in which the signals reach different terminals of the fingerprint recognition chip IC in a same sub-period as described above, this embodiment of the present disclosure can reduce the number of terminals of the fingerprint recognition chip IC.

As shown in FIGS. 12 to 14, in one fingerprint recognition period 260, each fingerprint recognition signal terminal 251 synchronously transmits a drive signal DR.

As shown in FIG. 9 and FIG. 12, in one fingerprint recognition period 260, each fingerprint recognition signal terminal 251 synchronously transmits a drive signal DR. This one fingerprint recognition period 260 includes $m_1$ sub-periods 261 such as a $1^{st}$ sub-period 261, a $2^{nd}$ sub-period 261, . . . , an $m_1^{th}$ sub-period 261 and the like. In the $1^{st}$ sub-period 261, a $1^{st}$ control signal line 240 transmits a turned-on signal ON, and each fingerprint recognition signal terminal 251 transmits a drive signal DR to a fingerprint recognition electrode block 211 of a corresponding fingerprint recognition electrode block group 210 via a $1^{st}$ switch transistor 231 of each transistor group 230 and a $1^{st}$ fingerprint recognition signal line 221 of each fingerprint recognition signal line group 220. In the $2^{nd}$ sub-period 261, a $2^{nd}$ control signal line 240 transmits a turned-on signal ON, and each fingerprint recognition signal terminal 251 transmits a drive signal DR to a fingerprint recognition electrode block 211 of a corresponding fingerprint recognition electrode block group 210 via a $2^{nd}$ switch transistor 231 of each transistor group 230 and a $2^{nd}$ fingerprint recognition signal line 221 of each fingerprint recognition signal line group 220. In the $m_1^{th}$ sub-period 261, an $m_1^{th}$ control signal line 240 transmits a turned-on signal ON, and each fingerprint recognition signal terminal 251 transmits a drive signal DR to a fingerprint recognition electrode block 211 of a corresponding fingerprint recognition electrode block group 210 via a $m_1^{th}$ switch transistor 231 of each transistor group 230 and a $m_1^{th}$ fingerprint recognition signal line 221 of each fingerprint recognition signal line group 220. In this way, the fingerprint recognition electrode block 211 of the fingerprint recognition electrode block group 210 can detect the fingerprint.

As shown in FIGS. 8, 10, and 13, in one fingerprint recognition period 260, each fingerprint recognition signal terminal 251 synchronously transmits a drive signal DR. This one fingerprint recognition period 260 includes $m_1/2$ sub-periods 261 such as a $1^{st}$ sub-period 261, a $2^{nd}$ sub-period 261, . . . , a $(m_1/2)^{th}$ sub-period 261 and the like. In the $1^{st}$ sub-period 261, a $1^{st}$ control signal line 240 transmits a turned-on signal ON, and each fingerprint recognition signal terminal 251 transmits a drive signal DR to a fingerprint recognition electrode block 211 of a corresponding fingerprint recognition electrode block group 210 via $1^{st}$ and $2^{nd}$ switch transistors 231 of each transistor group 230 and $1^{st}$ and $2^{nd}$ fingerprint recognition signal lines 221 of each fingerprint recognition signal line group 220. In the $2^{nd}$ sub-period 261, a $2^{nd}$ control signal line 240 transmits a turned-on signal ON, and each fingerprint recognition signal terminal 251 transmits a drive signal DR to a fingerprint recognition electrode block 211 of a corresponding fingerprint recognition electrode block group 210 via $3^{rd}$ and $4^{th}$ switch transistors 231 of each transistor group 230 and $3^{rd}$ and $4^{th}$ fingerprint recognition signal lines 221 of each fingerprint recognition signal line group 220. In the $(m_1/2)^{th}$ sub-period 261, a $(m_1/2)^{th}$ control signal line 240 transmits a turned-on signal ON, and each fingerprint recognition signal terminal 251 transmits a drive signal DR to a fingerprint recognition electrode block 211 of a corresponding fingerprint recognition electrode block group 210 via $(m_1-1)^{th}$ and $m_1^{th}$ switch transistors 231 of each transistor group 230 and $(m_1-1)^{th}$ and $m_1^{th}$ fingerprint recognition signal lines 221 of each fingerprint recognition signal line group 220. In this way, the fingerprint recognition electrode block 211 of the fingerprint recognition electrode block group 210 can detect the fingerprint.

As shown in FIGS. 8, 11, and 14, in one fingerprint recognition period 260, each fingerprint recognition signal terminal 251 synchronously transmits a drive signal DR. This one fingerprint recognition period 260 includes $m_1/2$ sub-periods 261 such as a $1^{st}$ sub-period 261, a $2^{nd}$ sub-period 261, . . . , a $(m_1/2)^{th}$ sub-period 261 and the like. In the $1^{st}$ sub-period 261, a first control signal line 240 transmits a turned-on signal ON, and each fingerprint recognition signal terminal 251 transmits a drive signal DR to a fingerprint recognition electrode block 211 of a corresponding fingerprint recognition electrode block group 210 via $1^{st}$ and $2^{nd}$ switch transistors 231 of each transistor group 230 and $1^{st}$ and $2^{nd}$ fingerprint recognition signal lines 221 of each fingerprint recognition signal line group 220. In the $2^{nd}$ sub-period 261, a $2^{nd}$ control signal line 240 transmits a turned-on signal ON, and each fingerprint recognition signal terminal 251 transmits a drive signal DR to a fingerprint recognition electrode block 211 of a corresponding fingerprint recognition electrode block group 210 via $3^{rd}$ and $4^{th}$ switch transistors 231 of each transistor group 230 and $3^{rd}$ and $4^{th}$ fingerprint recognition signal lines 221 of each fingerprint recognition signal line group 220. In the $(m_1/2)^{th}$ sub-period 261, a $(m_1/2)^{th}$ control signal line 240 transmits a turned-on signal ON, and each fingerprint recognition signal terminal 251 transmits a drive signal DR to a fingerprint recognition electrode block 211 of a corresponding fingerprint recognition electrode block group 210 via an $m_1^{th}$ switch transistors 231 of each transistor group 230 and an $m_1^{th}$ fingerprint recognition signal lines 221 of each fingerprint recognition signal line group 220. In this way, the fingerprint recognition electrode block 211 of the fingerprint recognition electrode block group 210 can detect the fingerprint.

Figure 15:
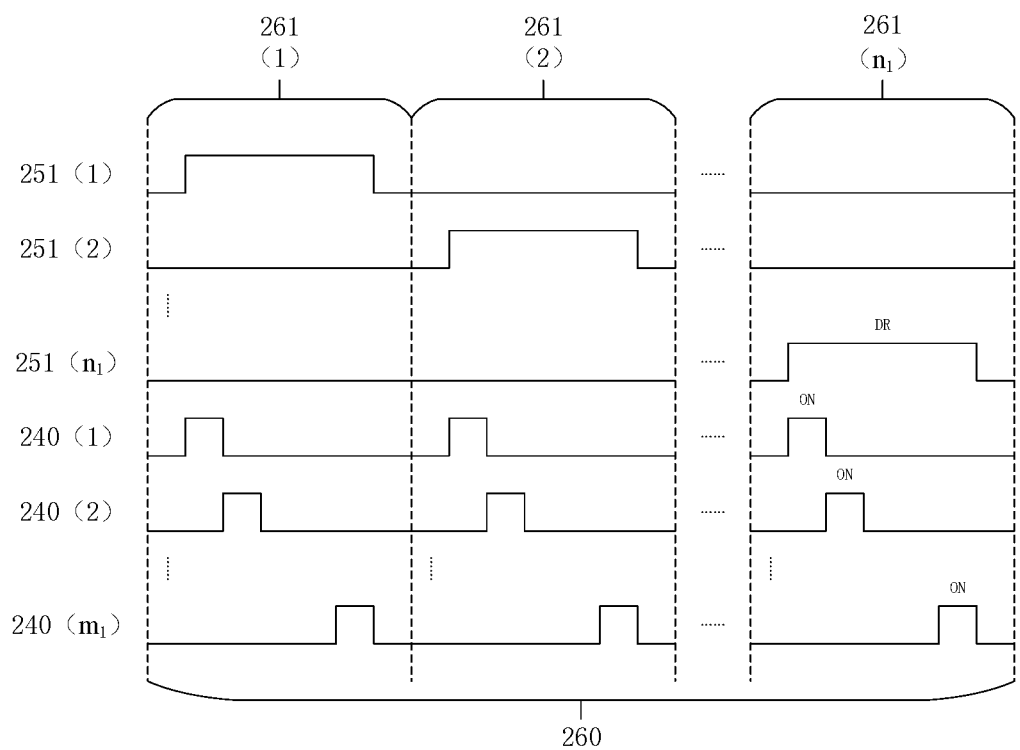
FIG. 15 is a time sequence diagram of yet another display panel according to an embodiment of the present disclosure.
Figure 16:
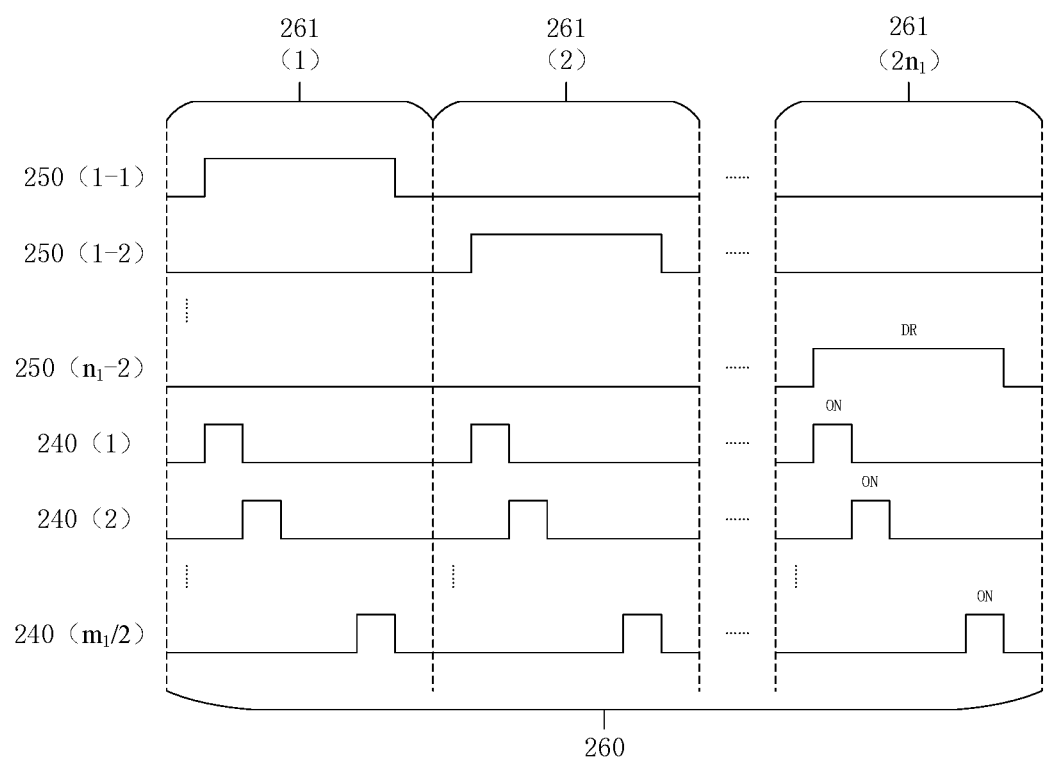
FIG. 16 is a time sequence diagram of yet another display panel according to an embodiment of the present disclosure.
Figure 17:
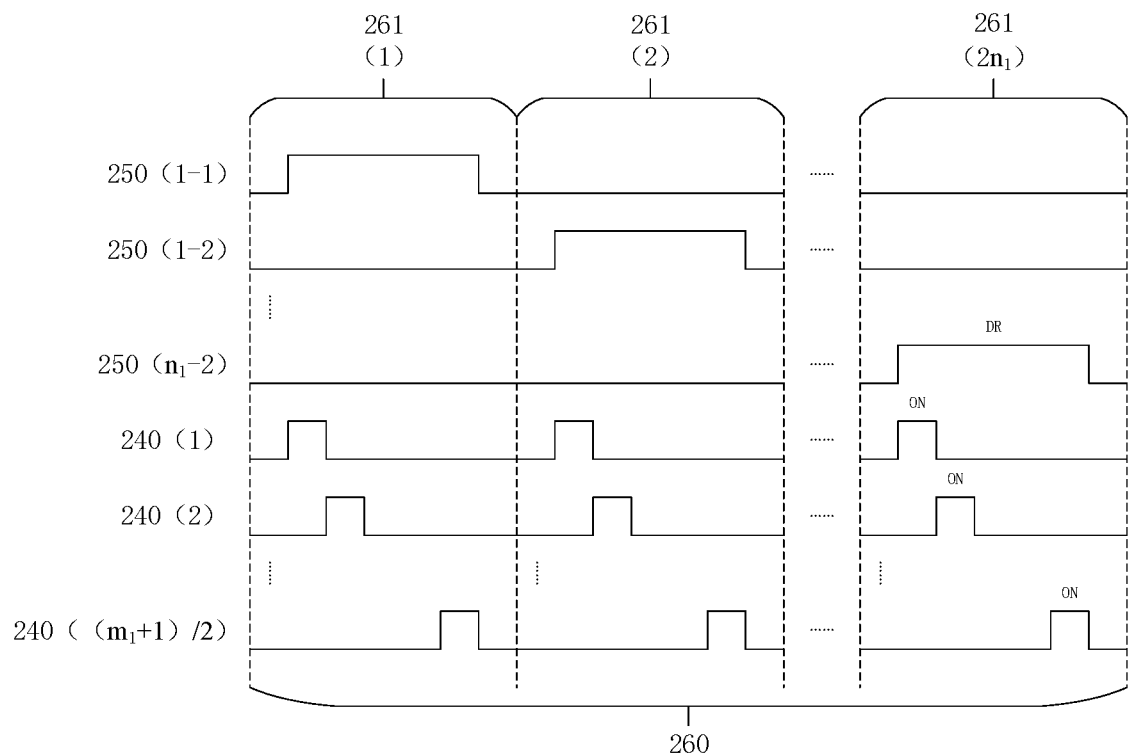
FIG. 17 is a time sequence diagram of yet another display panel according to an embodiment of the present disclosure.

FIG. 15 is a time sequence diagram of yet another display panel according to an embodiment of the present disclosure.
FIG. 16 is a time sequence diagram of yet another display panel according to an embodiment of the present disclosure.
FIG. 17 is a time sequence diagram of yet another display panel according to an embodiment of the present disclosure.

As shown in FIGS. 15 to 17, one fingerprint recognition period 260 includes multiple sub-periods 261. In one sub-period 261, each of the control signal lines 240 sequentially transmits a turned-on signal ON.

As shown in FIG. 9 and FIG. 15, one fingerprint recognition period 260 includes multiple sub-periods 261. In one sub-period 261, each of $m_1$ control signal lines 240 sequentially transmits a turned-on signal ON. For example, in a $1^{st}$ sub-period 261, a $1^{st}$ control signal line 240 transmits a turned-on signal ON, a $2^{nd}$ control signal line 240 transmits a turned-on signal ON, and an $m_1$ control signal line 240 transmits a turned-on signal ON, in sequence. In a $2^{nd}$ sub-period 261, the $1^{st}$ control signal line 240 transmits a turned-on signal ON, the $2^{nd}$ control signal line 240 transmits a turned-on signal ON, and the $m_1^{th}$ control signal line 240 transmits a turned-on signal ON, in sequence. In an $n_1^{th}$ sub-period 261, the $1^{st}$ control signal line 240 transmits a turned-on signal ON, the $2^{nd}$ control signal line 240 transmits a turned-on signal ON, and the $m_1^{th}$ control signal line 240 transmits a turned-on signal ON, in sequence. In this way, the $n_1$ fingerprint recognition signal terminals 251 can transmit a drive signal DR to the fingerprint recognition electrode block 211 of the fingerprint recognition electrode block group 210 respectively in the $n_1$ sub-periods 261.

As shown in FIGS. 8, 10 and 16, one fingerprint recognition period 260 includes multiple sub-periods 261. In one sub-period 261, each of $m_1/2$ control signal lines 240 sequentially transmits a turned-on signal ON. For example, in a $1^{st}$ sub-period 261, a $1^{st}$ control signal line 240 transmits a turned-on signal ON, a $2^{nd}$ control signal line 240 transmits a turned-on signal ON, and a $(m_1/2)^{th}$ control signal line 240 transmits a turned-on signal ON. In a $2^{nd}$ sub-period 261, the $1^{st}$ control signal line 240 transmits a turned-on signal ON, the $2^{nd}$ control signal line 240 transmits a turned-on signal ON, and the $(m_1/2)^{th}$ control signal line 240 transmits a turned-on signal ON. In a $(2n_1)^{th}$ sub-period 261, the $1^{st}$ control signal line 240 transmits a turned-on signal ON, the $2^{nd}$ control signal line 240 transmits a turned-on signal ON, and the $(m_1/2)^{th}$ control signal line 240 transmits a turned-on signal ON. In this way, the $2n_1$ fingerprint recognition signal terminals 251 of $n_1$ fingerprint recognition signal terminal groups 250 can transmit a drive signal DR to the fingerprint recognition electrode block 211 of the fingerprint recognition electrode block group 210 respectively in the $2n_1$ sub-periods 261.

As shown in FIGS. 8, 11 and 17, one fingerprint recognition period 260 includes multiple sub-periods 261. In one sub-period 261, each of $(m_1+1)/2$ control signal lines 240 sequentially transmits a turned-on signal ON. For example, in a $1^{st}$ sub-period 261, a $1^{st}$ control signal line 240 transmits a turned-on signal ON, a $2^{nd}$ control signal line 240 transmits a turned-on signal ON, and a $((m_1+1)/2)^{th}$ control signal line 240 transmits a turned-on signal ON. In a $2^{nd}$ sub-period 261, the $1^{st}$ control signal line 240 transmits a turned-on signal ON, the $2^{nd}$ control signal line 240 transmits a turned-on signal ON, and the $((m_1+1)/2)^{th}$ control signal line 240 transmits a turned-on signal ON. In a $(2n_1)^{th}$ sub-period 261, the $1^{st}$ control signal line 240 transmits a turned-on signal ON, the $2^{nd}$ control signal line 240 transmits a turned-on signal ON, and the $((m_1+1)/2)^{th}$ control signal line 240 transmits a turned-on signal ON. In this way, the $2n_1$ fingerprint recognition signal terminals 251 of $n_1$ fingerprint recognition signal terminal groups 250 can transmit a drive signal DR to the fingerprint recognition electrode block 211 of the fingerprint recognition electrode block group 210 respectively in the $2n_1$ sub-periods 261.

As shown in FIGS. 15 to 17, in one fingerprint recognition period 260, each of the fingerprint recognition signal terminals 251 sequentially transmits a drive signal DR. In one sub-period 261, one fingerprint recognition signal terminal 251 transmits a drive signal DR, and the other fingerprint recognition signal terminals 251 do not transmit a drive signal DR.

As shown in FIG. 9 and FIG. 15, in one fingerprint recognition period 260, each of the fingerprint recognition signal terminals 251 sequentially transmits a drive signal DR. In one sub-period 261, one fingerprint recognition signal terminal 251 transmits a drive signal DR and the other fingerprint recognition signal terminals 251 do not transmit a drive signal DR. For example, in a $1^{st}$ sub-period 261, a $1^{st}$ fingerprint recognition signal terminal 251 transmits a drive signal DR, and the other fingerprint recognition signal terminals 251 do not transmit a drive signal DR; and meanwhile, each of the control signal lines 240 sequentially transmits a turned-on signal ON, and the drive signal DR from the $1^{st}$ fingerprint recognition signal terminal 251 reaches a corresponding fingerprint recognition electrode block 211 via a corresponding switch transistor 231 and a corresponding fingerprint recognition signal line 221. In a $2^{nd}$ sub-period 261, a $2^{nd}$ fingerprint recognition signal terminal 251 transmits a drive signal DR, and the other fingerprint recognition signal terminals 251 do not transmit a drive signal DR; and meanwhile, each of the control signal lines 240 sequentially transmits a turned-on signal ON, and the drive signal DR from the $2^{nd}$ fingerprint recognition signal terminal 251 reaches a corresponding fingerprint recognition electrode block 211 via a corresponding switch transistor 231 and a corresponding fingerprint recognition signal line 221. In a $n_1^{th}$ sub-period 261, a $n_1^{th}$ fingerprint recognition signal terminal 251 transmits a drive signal DR, and the other fingerprint recognition signal terminals 251 do not transmit a drive signal DR. Meanwhile, each of the control signal lines 240 sequentially transmits a turned-on signal ON, and the drive signal DR from the $n_1^{th}$ fingerprint recognition signal terminal 251 reaches a corresponding fingerprint recognition electrode block 211 via a corresponding switch transistor 231 and a corresponding fingerprint recognition signal line 221. In this way, the fingerprint recognition electrode block 211 of the fingerprint recognition electrode block group 210 can detect the fingerprint.

As shown in FIGS. 8, 10, 11, 16 and 17, in one fingerprint recognition period 260, each of the fingerprint recognition signal terminals 251 sequentially transmits a drive signal DR. In one sub-period 261, one fingerprint recognition signal terminal 251 transmits a drive signal DR, and the other fingerprint recognition signal terminals 251 do not transmit a drive signal DR. For example, in a $1^{st}$ sub-period 261, one fingerprint recognition signal terminal 251 of a $1^{st}$ fingerprint recognition signal terminal group 250 transmits a drive signal DR, and the other fingerprint recognition signal terminals 251 do not transmit a drive signal DR. Meanwhile, each of the control signal lines 240 sequentially transmits a turned-on signal ON, and the drive signal DR from this one fingerprint recognition signal terminal 251 reaches a corresponding fingerprint recognition electrode block 211 via a corresponding switch transistor 231 and a corresponding fingerprint recognition signal line 221. In a $2^{nd}$ sub-period 261, another fingerprint recognition signal terminal 251 of the $1^{st}$ fingerprint recognition signal terminal group 250 transmits a drive signal DR, and the other fingerprint recognition signal terminals 251 do not transmit a drive signal DR. Meanwhile, each of the control signal lines 240 sequentially transmits a turned-on signal ON, and the drive signal DR from another fingerprint recognition signal terminal 251 reaches a corresponding fingerprint recognition electrode block 211 via a corresponding switch transistor 231 and a corresponding fingerprint recognition signal line 221. In a $3^{rd}$ sub-period 261, one fingerprint recognition signal terminal 251 of a $2^{nd}$ fingerprint recognition signal terminal group 250 transmits a drive signal DR, and the other fingerprint recognition signal terminals 251 do not transmit a drive signal DR. Meanwhile, each of the control signal lines 240 sequentially transmits a turned-on signal ON, and the drive signal DR from this one fingerprint recognition signal terminal 251 reaches a corresponding fingerprint recognition electrode block 211 via a corresponding switch transistor 231 and a corresponding fingerprint recognition signal line 221. In a $4^{th}$ sub-period 261, another fingerprint recognition signal terminal 251 of the $2^{nd}$ fingerprint recognition signal terminal group 250 transmits a drive signal DR, and the other fingerprint recognition signal terminals 251 do not transmit a drive signal DR. Meanwhile, each of the control signal lines 240 sequentially transmits a turned-on signal ON, and the drive signal DR from another fingerprint recognition signal terminal 251 reaches a corresponding fingerprint recognition electrode block 211 via a corresponding switch transistor 231 and a corresponding fingerprint recognition signal line 221. In a $(2n_1-1)^{th}$ sub-period 261, one fingerprint recognition signal terminal 251 of a $n_1^{th}$ fingerprint recognition signal terminal group 250 transmits a drive signal DR, and the other fingerprint recognition signal terminals 251 do not transmit a drive signal DR. Meanwhile, each of the control signal lines 240 sequentially transmits a turned-on signal ON, and the drive signal DR from this one fingerprint recognition signal terminal 251 reaches a corresponding fingerprint recognition electrode block 211 via a corresponding switch transistor 231 and a corresponding fingerprint recognition signal line 221. In a $(2n_1)^{th}$ sub-period 261, another fingerprint recognition signal terminal 251 of the $n_1^{th}$ fingerprint recognition signal terminal group 250 transmits a drive signal DR, and the other fingerprint recognition signal terminals 251 do not transmit a drive signal DR; and meanwhile, each of the control signal lines 240 sequentially transmits a turned-on signal ON, and the drive signal DR from another fingerprint recognition signal terminal 251 reaches a corresponding fingerprint recognition electrode block 211 via a corresponding switch transistor 231 and a corresponding fingerprint recognition signal line 221. In this way, the fingerprint recognition electrode block 211 of the fingerprint recognition electrode block group 210 can detect the fingerprint.

As shown in FIGS. 2 to 11, the display panel 200 is used for self-capacitance fingerprint recognition or optical fingerprint recognition.

In an embodiment of the present disclosure, the display panel 200 is used for self-capacitance fingerprint recognition. The fingerprint recognition electrode block 211 of the fingerprint recognition electrode block group 210 is a self-capacitance electrode block. The display panel 200 performs fingerprint recognition based on self-capacitance between the fingerprint recognition electrode block 211 of the fingerprint recognition electrode block group 210 and the ground. Alternatively, the display panel 200 is used for optical fingerprint recognition. The fingerprint recognition electrode block 211 of the fingerprint recognition electrode block group 210 is electrically connected to an optical sensor, and the display panel 200 performs fingerprint recognition based on a signal from the optical sensor.

Figure 18:
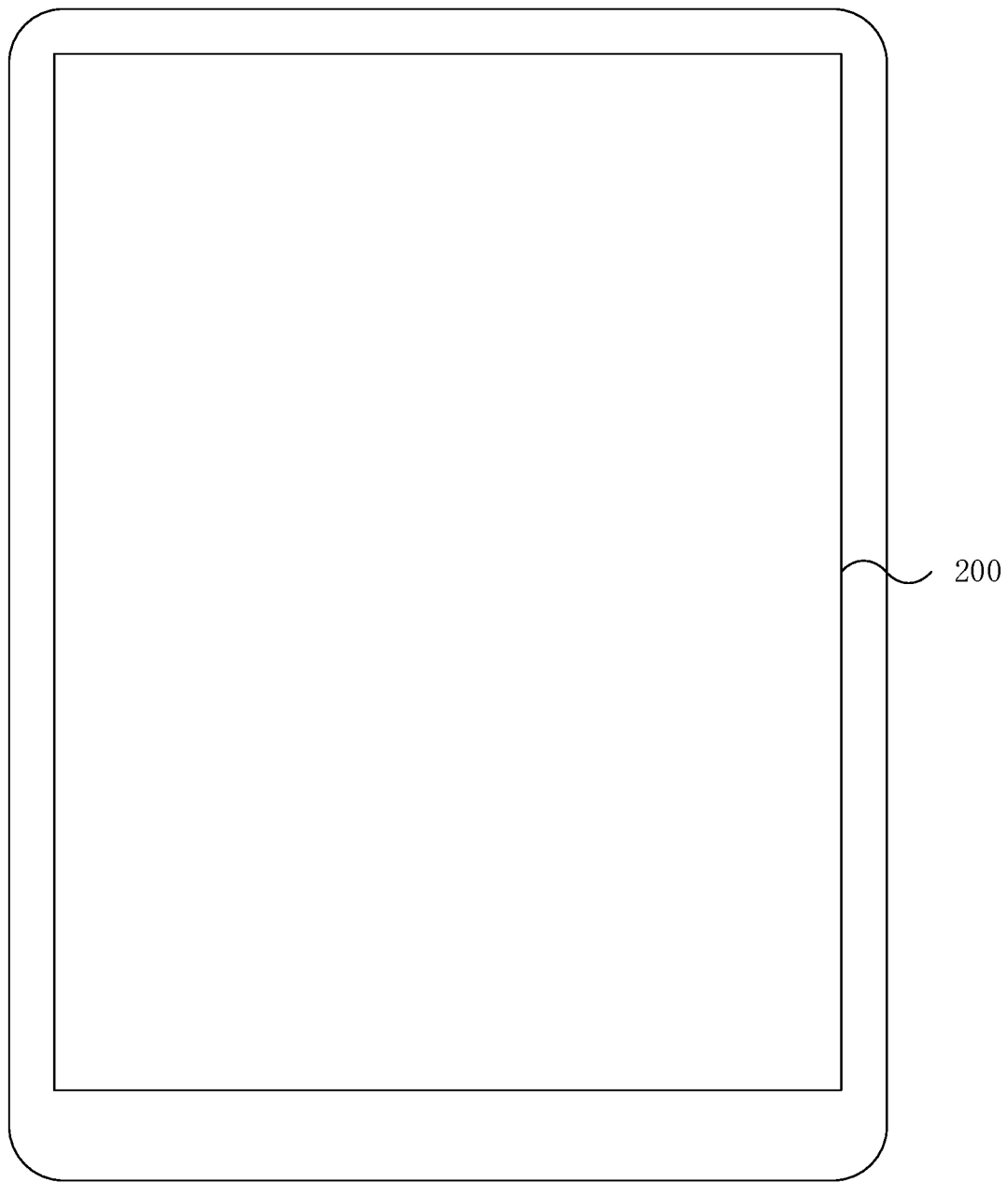
FIG. 18 is a structural schematic diagram of a display device according to an embodiment of the present disclosure.

FIG. 18 is a structural schematic diagram of a display device according to an embodiment of the present disclosure.

As shown in FIG. 18, the display device 300 includes a display panel 200.

In an embodiment of the present disclosure, the display device 300 achieves display by using the display panel 200, such as a smart phone or the like. The display panel 200 has been described above and will not be further described herein.

In summary, the present disclosure provides a display panel and a display device. The display panel has a display area and a non-display area surrounding the display area. The display panel includes, in the display area: fingerprint recognition electrode block groups arranged in $M_1$ row and $N_1$ columns, each fingerprint recognition electrode block group of the fingerprint recognition electrode block groups including fingerprint recognition electrode blocks arranged in $m_1$ rows and $n_1$ columns; and fingerprint recognition signal line groups, each fingerprint recognition signal line group of the fingerprint recognition signal line groups including a fingerprint recognition signal line. The display panel further includes, in the non-display area: a transistor group including a switch transistor; and a control signal line. In an embodiment of the present disclosure, a fingerprint recognition electrode block in a $x_1^{th}$ row and $y_1^{th}$ column of a fingerprint recognition electrode block group in an $X_1^{th}$ row and $Y_1^{th}$ column is electrically connected to a fingerprint recognition electrode block in a $x_2^{th}$ row and $y_2^{th}$ column of a fingerprint recognition electrode block group in an $X_2^{th}$ row and $Y_2^{th}$ via one fingerprint recognition signal line. This one fingerprint recognition signal line is electrically connected to a first electrode of the switch transistor of one transistor group. A control electrode of this transistor is electrically connected to one control signal line. The present disclosure can reduce the number of fingerprint recognition signal lines and the number of terminals of the fingerprint recognition chip.

The above-described embodiments are merely preferred embodiments of the present disclosure and are not intended to limit the present disclosure. Various changes and modifications can be made to the present disclosure by those skilled in the art. Any modifications, equivalent substitutions and improvements made within the principle of the present disclosure shall fall into the protection scope of the present disclosure.

What is claimed is:

1. A display panel having a display area and a non-display area surrounding the display area, the display panel comprising:
  in the display area:
    fingerprint recognition electrode block groups arranged in $M_1$ rows and $N_1$ columns, each of the fingerprint recognition electrode block groups comprising fingerprint recognition electrode blocks arranged in $m_1$ rows and $n_1$ columns, where $M_1$, $N_1$, $m_1$ and $n_1$ are natural numbers, and where $n_1 \geq 2$ and $m_1 \geq 2$; and
    at least one fingerprint recognition signal line group, each of the at least one fingerprint recognition signal line group comprising fingerprint recognition signal lines;
  in the non-display area:
    at least one transistor group, each of the at least one transistor group comprising switch transistors; and
    control signal lines,
  wherein a fingerprint recognition electrode block in an $x_1^{th}$ row and $y_1^{th}$ column of a fingerprint recognition electrode block group in an $X_1^{th}$ row and $Y_1^{th}$ column is electrically connected to a fingerprint recognition electrode block in an $x_2^{th}$ row and $y_2^{th}$ column of a fingerprint recognition electrode block group in an $X_2^{th}$ row and $Y_2^{th}$ column via one of the fingerprint recognition signal lines, where $X_1$, $Y_1$, $x_1$, $y_1$, $X_2$, $Y_2$, $x_2$ and $y_2$ are natural numbers, $X_1 \leq M_1$ and $X_2 \leq M_1$, $Y_1 \leq N_1$ and $Y_2 \leq N_1$, $X_1 \neq X_2$, $Y_1 \neq Y_2$, $x_1 \leq m_1$ and $x_2 \leq m_1$, $y_1 \leq n_1$ and $y_2 \leq n_1$;
  the one of the fingerprint recognition signal lines is electrically connected to a first electrode of one switch transistor of one of the at least one transistor group; and a control electrode of the switch transistor is electrically connected to one of the control signal lines; and
  two fingerprint recognition electrode blocks are respectively arranged in two of the fingerprint recognition electrode block groups arranged in one of $N_1$ columns and are arranged in a same one of $n_1$ columns of the two fingerprint recognition electrode block groups, and the two fingerprint recognition electrode blocks are connected to two of the fingerprint recognition signal lines, respectively.

2. The display panel according to claim 1, wherein $x_1 = x_2$ and $y_1 = y_2$.

3. The display panel according to claim 2, comprising $n_1$ fingerprint recognition signal line groups, each of the $n_1$ fingerprint recognition signal line groups comprising $m_1$ fingerprint recognition signal lines;
  wherein the fingerprint recognition electrode block in the $x_1^{th}$ row and $y_1^{th}$ column of one of the fingerprint recognition electrode block groups is electrically connected to the fingerprint recognition electrode block in the $x_1{}^{th}$ row and $y_1{}^{th}$ column of any other of the fingerprint recognition electrode block groups;

a plurality of fingerprint recognition signal lines electrically connected to the fingerprint recognition electrode blocks in a $j^{th}$ column of one fingerprint recognition electrode block group belongs to a $j^{th}$ fingerprint recognition signal line group, and a plurality of fingerprint recognition signal lines electrically connected to the fingerprint recognition electrode blocks in an $i^{th}$ column of one fingerprint recognition electrode block group belongs to $i^{th}$ fingerprint recognition signal lines of different fingerprint recognition signal line groups, where $j \leq n_1$ and $i \leq m_1$; and the fingerprint recognition electrode block in the $x_1{}^{th}$ row and y $i^{th}$ column of each fingerprint recognition electrode block group is electrically connected to an $x_1{}^{th}$ fingerprint recognition signal line of a $y_1{}^{th}$ fingerprint recognition signal line group.

4. The display panel according to claim 3, wherein the display panel comprises $n_1$ transistor groups, each of the $n_1$ transistor groups comprising $m_1$ switch transistors;

wherein the $m_1$ switch transistors corresponding to $m_1$ fingerprint recognition signal lines of the $j^{th}$ fingerprint recognition signal line group belong to a $j^{th}$ transistor group, and an $i^{th}$ switch transistor corresponds to the $i^{th}$ fingerprint recognition signal line of one fingerprint recognition signal line group; and wherein the $x_1{}^{th}$ fingerprint recognition signal line of the $y_1{}^{th}$ fingerprint recognition signal line group is electrically connected to a first electrode of an $x_1{}^{th}$ switch transistor of a $y_1{}^{th}$ transistor group.

5. The display panel according to claim 4, wherein the display panel comprises $m_1$ control signal lines; and wherein the $m_1$ control signal lines are electrically connected to control electrodes of the $m_1$ switch transistors of one of the $n_1$ transistor groups.

6. The display panel according to claim 5, wherein a control electrode of the $i^{th}$ switch transistor of each of the $n_1$ transistor groups is electrically connected to a same $i^{th}$ control signal line.

7. The display panel according to claim 4, further comprising a fingerprint recognition chip, wherein the fingerprint recognition chip comprises $n_1$ fingerprint recognition signal terminals; and wherein one of the $n_1$ fingerprint recognition signal terminals is electrically connected to second electrodes of all switch transistors of one transistor group.

8. The display panel according to claim 4, wherein:

$m_1$ is an even number;

the display panel further comprises a fingerprint recognition chip, and the fingerprint recognition chip comprises $n_1$ fingerprint recognition signal terminal groups; each of the $n_1$ fingerprint recognition signal terminal groups comprises at least two fingerprint recognition signal terminals; one of the at least two fingerprint recognition signal terminals is electrically connected to second electrodes of $m_1/2$ switch transistors of one transistor group, and another one of the at least two fingerprint recognition signal terminals is electrically connected to second electrodes of other $m_1/2$ switch transistors of the one transistor group; and the display panel further comprises $m_1/2$ control signal lines, and control electrodes of a plurality of switch transistors of a same transistor group that are electrically connected to a same fingerprint recognition signal terminal are respectively electrically connected to different control signal lines.

9. The display panel according to claim 8, wherein in one fingerprint recognition period, each of the control signal lines sequentially transmits a turned-on signal.

10. The display panel according to claim 9, wherein in one fingerprint recognition period, each of the fingerprint recognition signal terminals synchronously transmits a drive signal.

11. The display panel according to claim 8, wherein one fingerprint recognition period comprises a plurality of sub-periods; and in one of the plurality of sub-sub-periods, each of the control signal lines sequentially transmits a turned-on signal.

12. The display panel according to claim 11, wherein in the one fingerprint recognition period, each of the fingerprint recognition signal terminals sequentially transmits a drive signal; and in one of the plurality of sub-periods, one of the at least two fingerprint recognition signal terminals transmits a drive signal while any other one of the at least two fingerprint recognition signal terminals does not transmit a drive signal.

13. The display panel according to claim 4, wherein:

$m_1$ is an odd number;

each transistor group further comprises a dummy transistor, and a first electrode of the dummy transistor is suspended;

the display panel further comprises a fingerprint recognition chip, and the fingerprint recognition chip comprises $n_1$ fingerprint recognition signal terminal groups; each of the $n_1$ fingerprint recognition signal terminal groups comprises at least two fingerprint recognition signal terminals; one of the at least two fingerprint recognition signal terminals is electrically connected to second electrodes of $(m_1+1)/2$ switch transistors of one transistor group, and another one of the at least two fingerprint recognition signal terminals is electrically connected to second electrodes of other $((m_1+1)/2)-1$ switch transistors and the dummy transistor of the one transistor group; and the display panel further comprises $(m_1+1)/2$ control signal lines, and control electrodes of switch transistors and the dummy transistor of a same transistor group that are electrically connected to a same fingerprint recognition signal terminal are respectively electrically connected to different control signal lines.

14. The display panel according to claim 13, wherein in one fingerprint recognition period, each of the control signal lines sequentially transmits a turned-on signal.

15. The display panel according to claim 13, wherein one fingerprint recognition period comprises a plurality of sub-periods; and in one of the plurality of sub-sub-periods, each of the control signal lines sequentially transmits a turned-on signal.

16. The display panel according to claim 1, wherein the display panel is used for self-capacitance fingerprint recognition or optical fingerprint recognition.

17. A display device, comprising a display panel, the display panel having a display area and a non-display area surrounding the display area, the display panel comprising:

in the display area:

fingerprint recognition electrode block groups arranged in $M_1$ rows and $N_1$ columns, each of the fingerprint recognition electrode block groups comprising fingerprint recognition electrode blocks arranged in $m_1$ rows and $n_1$ columns, where $M_1$, $N_1$, $m_1$ and $n_1$ are natural numbers, and where $n_1 \geq 2$ and $m_1 \geq 2$; and at least one fingerprint recognition signal line group, each of the at least one fingerprint recognition signal line group comprising fingerprint recognition signal lines;

in the non-display area:

at least one transistor group, each of the at least one transistor group comprising switch transistors; and control signal lines, wherein a fingerprint recognition electrode block in an $x_1^{th}$ row and $y_1^{th}$ column of a fingerprint recognition electrode block group in an $X_1^{th}$ row and $Y_1^{th}$ column is electrically connected to a fingerprint recognition electrode block in an $x_2^{th}$ row and $y_2^{th}$ column of a fingerprint recognition electrode block group in an $X_2^{th}$ row and $Y_2^{th}$ column via one of the fingerprint recognition signal lines, where $X_1$, $Y_1$, $x_1$, $y_1$, $X_2$, $Y_2$, $x_2$ and $y_2$ are natural numbers, $X_1 \leq M_1$ and $X_2 \leq M_1$, $Y_1 \leq N_1$ and $Y_2 \leq N_1$, $X_1 \neq X_2$, $Y_1 \neq Y_2$, $x_1 \leq m_1$ and $x_2 \leq m_1$, $y_1 \leq n_1$ and $y_2 \leq n_1$;

the one of the fingerprint recognition signal lines is electrically connected to a first electrode of one switch transistor of one of the at least one transistor group; and a control electrode of the switch transistor is electrically connected to one of the control signal lines; and two fingerprint recognition electrode blocks are respectively arranged in two of the fingerprint recognition electrode block groups arranged in one of $N_1$ columns and are arranged in a same one of $n_1$ columns of the two fingerprint recognition electrode block groups, and the two fingerprint recognition electrode blocks are connected to two of the fingerprint recognition signal lines, respectively.

* * * * *